United States Patent
Ziarno

(10) Patent No.: US 11,325,723 B2
(45) Date of Patent: May 10, 2022

(54) WIRELESS ENGINE MONITORING SYSTEM FOR ENVIRONMENTAL EMISSION CONTROL AND AIRCRAFT NETWORKING

(71) Applicant: HARRIS CORPORATION, Melbourne, FL (US)

(72) Inventor: James J. Ziarno, Malabar, FL (US)

(73) Assignee: HARRIS CORPORATION, Melbourne, FL (US)

( * ) Notice: Subject to any disclaimer, the term of this patent is extended or adjusted under 35 U.S.C. 154(b) by 88 days.

(21) Appl. No.: 16/876,881

(22) Filed: May 18, 2020

(65) Prior Publication Data

US 2020/0277084 A1 Sep. 3, 2020

Related U.S. Application Data

(62) Division of application No. 15/883,140, filed on Jan. 30, 2018, now Pat. No. 10,703,504, which is a division of application No. 15/063,856, filed on Mar. 8, 2016, now Pat. No. 10,035,609.

(51) Int. Cl.
*B64D 45/00* (2006.01)
*G07C 5/00* (2006.01)
*G07C 5/08* (2006.01)
*F02C 9/00* (2006.01)
(Continued)

(52) U.S. Cl.
CPC .............. *B64D 45/00* (2013.01); *B64F 5/60* (2017.01); *F02C 9/00* (2013.01); *G05B 23/0283* (2013.01); *G07C 5/008* (2013.01); *G07C 5/085* (2013.01); *G07C 5/0808* (2013.01); *F05D 2260/80* (2013.01); *G05B 2219/15117* (2013.01); *G05B 2219/45071* (2013.01)

(58) Field of Classification Search
CPC ....... B64D 45/00; F02C 9/00; G05B 23/0283; G07C 5/008; G07C 5/0808; G07C 5/085; B64F 5/60
USPC .......................................................... 701/14
See application file for complete search history.

(56) References Cited

U.S. PATENT DOCUMENTS

| 3,983,548 A | 9/1976 | Tufts |
| 5,208,590 A | 5/1993 | Pitts |
| 5,546,183 A | 8/1996 | Fegley et al. |

(Continued)

FOREIGN PATENT DOCUMENTS

| CN | 101236129 | 8/2008 |
| EP | 1455313 | 9/2004 |

(Continued)

OTHER PUBLICATIONS

"Air Quality," Laboratory for Aviation and Environment— Massachusetts Institute of Technology: http://lae.mit.edu/air-quality: retrieved from internet Apr. 22, 2016; pp. 3.

(Continued)

*Primary Examiner* — Isaac G Smith
(74) *Attorney, Agent, or Firm* — Allen, Dyer, Doppelt + Gilchrist, P.A.

(57) ABSTRACT

A wireless engine monitoring system for an aircraft engine includes a housing and wireless transceiver that receives engine data, including engine data relating to environmental engine emissions. A processor processes the engine data and generates an alarm report when the environmental engine emissions exceed a threshold.

23 Claims, 18 Drawing Sheets

(51) Int. Cl.
  *G05B 23/02* (2006.01)
  *B64F 5/60* (2017.01)

(56) References Cited

U.S. PATENT DOCUMENTS

| | | | |
|---|---|---|---|
| 6,047,165 | A | 4/2000 | Wright et al. |
| 6,148,179 | A | 11/2000 | Wright et al. |
| 6,184,531 | B1 | 2/2001 | Smart et al. |
| 6,293,497 | B1 | 9/2001 | Kelley-Wickemeyer et al. |
| 6,353,734 | B1 | 3/2002 | Wright et al. |
| 6,473,677 | B1 | 10/2002 | Hershey et al. |
| 6,943,699 | B2 | 9/2005 | Ziarno |
| 7,202,948 | B2 | 4/2007 | Buckley et al. |
| 7,231,180 | B2 | 6/2007 | Benson et al. |
| 7,280,941 | B2 | 10/2007 | Bonanni et al. |
| 7,328,012 | B2 | 2/2008 | Ziarno et al. |
| 7,456,756 | B2 | 11/2008 | Ziarno |
| 7,595,739 | B2 | 9/2009 | Ziarno |
| 7,755,512 | B2 | 7/2010 | Ziarno |
| 7,979,192 | B2 | 7/2011 | Morrison et al. |
| 8,121,798 | B2 | 2/2012 | Lippert et al. |
| 8,126,628 | B2 | 2/2012 | Hershey et al. |
| 8,344,912 | B2 | 1/2013 | Mitchell et al. |
| 8,437,904 | B2 | 5/2013 | Mansouri et al. |
| 8,468,835 | B2 | 6/2013 | Demoss et al. |
| 8,495,922 | B1 | 7/2013 | Li-Jones |
| 8,560,368 | B1 | 10/2013 | Maity et al. |
| 8,689,538 | B2 | 4/2014 | Sankrithi et al. |
| 8,846,604 | B2 | 9/2014 | Hallaraker et al. |
| 8,869,537 | B2 | 10/2014 | Geis et al. |
| 9,002,629 | B2 | 4/2015 | Struzik |
| 9,026,273 | B2 | 5/2015 | Ziarno |
| 9,026,279 | B2 | 5/2015 | Ziarno |
| 9,026,336 | B2 | 5/2015 | Ziarno |
| 9,071,978 | B2 | 6/2015 | Anandappan et al. |
| 9,145,202 | B2 * | 9/2015 | Mathews, Jr. ......... B64D 31/06 |
| 9,152,146 | B2 | 10/2015 | Ziarno |
| 9,181,878 | B2 | 11/2015 | Moeckly et al. |
| 9,191,053 | B2 | 11/2015 | Ziarno et al. |
| 9,221,548 | B1 | 12/2015 | Sishtla et al. |
| 9,239,578 | B2 | 1/2016 | Ziarno |
| 9,269,205 | B1 | 2/2016 | Lamkin et al. |
| 9,483,951 | B1 | 11/2016 | McCusker |
| 9,581,727 | B1 | 2/2017 | Weiner et al. |
| 9,816,897 | B2 | 11/2017 | Ziarno |
| 10,035,609 | B2 | 7/2018 | Ziarno |
| 10,703,504 | B2 | 7/2020 | Ziarno |
| 2005/0213548 | A1 | 9/2005 | Benson et al. |
| 2006/0251507 | A1 | 11/2006 | Braswell et al. |
| 2009/0094076 | A1 | 4/2009 | Reddy |
| 2009/0114773 | A1 | 5/2009 | Helou, Jr. |
| 2009/0283080 | A1 | 11/2009 | Matas et al. |
| 2010/0206042 | A1 | 8/2010 | Johns et al. |
| 2011/0046818 | A1 | 2/2011 | Herkes et al. |
| 2012/0026016 | A1 | 2/2012 | Mitchell et al. |
| 2013/0060466 | A1 | 3/2013 | Gurusamy et al. |
| 2013/0098056 | A1 * | 4/2013 | Zhang ................ F02C 3/305 60/775 |
| 2013/0116884 | A1 | 5/2013 | Thompson et al. |
| 2013/0158832 | A1 | 6/2013 | Moeckly et al. |
| 2013/0332025 | A1 * | 12/2013 | Ziarno ............ G05B 23/0213 701/33.4 |
| 2014/0136028 | A1 | 5/2014 | Ausman et al. |
| 2014/0229139 | A1 | 8/2014 | Hegenbart et al. |
| 2015/0285158 | A1 | 10/2015 | Hillel et al. |
| 2015/0316926 | A1 | 11/2015 | Ziarno |
| 2015/0330869 | A1 | 11/2015 | Ziarno |
| 2015/0363981 | A1 | 12/2015 | Ziarno et al. |
| 2016/0207633 | A1 | 7/2016 | McWaters et al. |
| 2016/0321477 | A1 | 11/2016 | Reffe et al. |
| 2017/0026860 | A1 | 1/2017 | Fuller et al. |
| 2017/0121028 | A1 | 5/2017 | Visser et al. |
| 2017/0131687 | A1 | 5/2017 | Mercier-Calvairac et al. |
| 2017/0212011 | A1 | 7/2017 | Weickert et al. |
| 2017/0234224 | A1 | 8/2017 | Adibhatla |
| 2017/0259942 | A1 | 9/2017 | Ziarno |

FOREIGN PATENT DOCUMENTS

| | | |
|---|---|---|
| EP | 1560167 | 8/2005 |
| EP | 1916868 | 8/2008 |
| EP | 3217364 | 9/2017 |
| WO | 8602750 | 5/1986 |
| WO | 2009123774 | 10/2009 |
| WO | 2013184924 | 12/2013 |

OTHER PUBLICATIONS

"A Link Between Air Travel and Deaths on the Ground," Laboratory for Aviation and Environment—Massachusetts Institute of Technology: Sep. 1, 2010; pp. 3.

"Aviation Emissions, Impacts & Mitigation: A Primer," Federal Aviation Administration—Office of Environment and Energy: Jan. 2015; pp. 38.

"Embedded USB-to-Databus Interface Boards," Ballard Technology, copyright 1996-2016; retrieved from internet Apr. 22, 2016; pp. 1.

Barrett et al., "Global Mortality Attributable to Aircraft Cruise Emissions," Environ. Sci. Technol. 2010, vol. 44, No. 19: pp. 7736-7742.

"Commercial Aviation Impact on Environment," http://www.ourairspace.org/enviornmental.html: retrieved from internet Apr. 22, 2016; pp. 20.

"Federal Register—Part II—Environmental Protection Agency," Control of Air Pollution From Aircraft and Aircraft Engines; Emission Standards and Test Procedures; Final Rule; vol. 77, No. 117: Jun. 18, 2012: pp. 36342-36386.

Herndon, Scott Christopher, "Measurement of Gaseous HAP Emissions from Idling Aircraft as a Function of Engine and Ambient Conditions," Transportation Research Board; Jan. 1, 2012. Abstract Only.

Hutter, Ivan, "Engine Deterioration and Maintenance Actions," ICAO/Transport Canada Conference Aircraft Panel Montreal, Sep. 20-21, 2006; pp. 16.

"ICAO Aircraft Engine Emissions Databank," EASA—European Aviation Safety Agency: https://www.easa.europa.eu/document-library/icao-aircraft-engine-emissions-databank: retrieved from internet Apr. 22, 2016; pp. 8.

"GOGO Announces Automatic, In-Hangar Content Updates for GOGO Vision," IFExpress http://airfax.com/blog/index.php2015/11/24/gogo-anounces- . . . : Nov. 25, 2015: pp. 2.

"International Civil Aviation Organization," Environment Publications; http://www.icao.int/envirionmental-protection/pages/environment-publications.aspx: retrieved from internet Apr. 22, 2016; pp. 4.

Inman, Mason, "Plane Exhaust Kill More People Than Plane Crashes," http:/news.nationalgeorgraphic.com/news/2010/10/101005-planes-pollution-deaths-science-environment.html. retrieved from internet Apr. 22, 2016; pp. 8.

Lukachko et al., "Effects of Engine Aging on Aircraft Nox Emissions," The Amencan Society of Mechanical Engineers 97GT-398 1997: Presented at the International Gas Turbine & Aeroengine Congress & Exhibition Orlando, Florida; Jun. 2-5, 1997: pp. 15.

Nunez, Christina, "Why Some Airlines Pollute More: 20 Ranked on Fuel Efficiency," http:/news.nationalgeographic.com/energy/2015/11/15111-icct-transatlantic-airline-fuel-efficiencly-ranking.html: Nov. 1, 2015; pp. 8.

"Safeguarding Our Atmosphere: Glenn Research Reduces Harmful Aircraft Emissions," NASA Facts: FS-2000-01-010-GRC: Mar. 2000; pp. 4.

Thistle et al.,"Weather Effects on Drift Meteorological Factors and Spray Drift: An Overview," http:/www.fs.fed.us/eng/pubshtmlpubs/htm98342847/proc.htm: retrieved from internet Apr. 22, 2016; pp. 12.

Wayson et al., "Consideration of Air Quality Impacts By Airplane Operations at or Above 3000 feet AGL," U.S. Depailment of Transportation—Federal Aviation Administration: FAA-AEE-00-01 DT-34; Sep. 2000; pp. 13.

(56) References Cited

OTHER PUBLICATIONS

Whitefield et al., "Development of Exhaust Specification Profiles for Commercial Jet Engines," UMR Center of Excellence for Aerospace Particulate Emissions Reduction Research: Fall 2004; pp. 96.
Yay et al., "CFM56-7B24 Series Aircraft Engine Emission Measurements in Test Cell Environment and Emission Index Development," www.geiacenter.org/sites/ . . . retrieved from internet Apr. 22, 2016; pp. 1.

* cited by examiner

| ENGINE | FUEL FLOW (Kg/s) | | HC INDICE (g/Kg) | | CO INDICE (g/Kg) | | NO$_x$ INDICE (g/Kg) | |
|---|---|---|---|---|---|---|---|---|
| | CO | AP | CO | AP | CO | AP | CO | AP |
| JT9D-7A | 1.789 | 0.619 | 0.1 | 1.3 | 0 | 7.6 | 28.5 | 7.6 |
| JT9D-7F (MOD V) | 1.764 | 0.6237 | 0.3 | 0.5 | 0.4 | 2.9 | 34.4 | 7.8 |
| JT9D-7J | 1.902 | 0.679 | 0 | 0.5 | 0.9 | 5.5 | 34.9 | 9.4 |
| JT9D-20J | 1.902 | 0.679 | 0 | 0.5 | 0.9 | 5.5 | 34.9 | 9.4 |
| RB211-524B2 | 1.939 | 0.643 | 0.4 | 4.98 | 2.82 | 20 | 33 | 9.75 |
| RB211-524C2 | 2.02 | 0.74 | 0.22 | 4.42 | 1.63 | 18.9 | 32.3 | 10.4 |
| RB211-524D4 | 2.01 | 0.74 | 0.42 | 4.8 | 1.18 | 16.9 | 41 | 9.65 |

DERIVED EMISSION FACTORS (g/s), PER ENGINE (4 ENGINES ON AIRCRAFT)

| ENGINE | HC | | CO | | NO$_x$ | |
|---|---|---|---|---|---|---|
| | CO | AP | CO | AP | CO | AP |
| JT9D-7A | 0.1789 | 0.8047 | 0 | 4.7044 | 50.9865 | 4.7044 |
| JT9D-7F (MOD V) | 0.5292 | 0.31185 | 0.7056 | 1.80873 | 60.6816 | 4.86486 |
| JT9D-7J | 0 | 0.3395 | 1.7118 | 3.7345 | 66.3798 | 6.3826 |
| JT9D-20J | 0 | 0.3395 | 1.7118 | 3.7345 | 66.3798 | 6.3826 |
| RB211-524B2 | 0.7756 | 3.20214 | 5.46798 | 12.86 | 63.987 | 6.26925 |
| RB211-524C2 | 0.4444 | 3.2708 | 3.2926 | 13.986 | 65.246 | 7.696 |
| RB211-524D4 | 0.8442 | 3.552 | 2.3718 | 12.506 | 82.41 | 7.141 |
| MAXIMUM | 0.8442 | 3.552 | 5.46798 | 13.986 | 82.41 | 7.696 |
| EF, ALL 4 ENGINES | | 14.208 | | 55.944 | | 329.64 |

NOTE: CO = CLIMBOUT MODE, ALSO CORRESPONDING TO CRUISE MODE
AP = APPROACH MODE

FIG. 13

WIRELESS ENGINE MONITORING SYSTEM FOR ENVIRONMENTAL EMISSION CONTROL AND AIRCRAFT NETWORKING

PRIORITY APPLICATION

This application is a divisional application of U.S. patent application Ser. No. 15/883,140, filed Jan. 30, 2018, which is a divisional application of U.S. patent application Ser. No. 15/063,856, filed Mar. 8, 2016, now U.S. Pat. No. 10,035,609, issued Jul. 31, 2018, the disclosures of which are hereby incorporated by reference in their entirety.

FIELD OF THE INVENTION

This invention relates to real-time monitoring of aircraft engines and related components, and more particularly, this invention relates to a wireless engine monitoring system used in aircraft sensor networking, meeting emission standards, and determining a maintenance schedule for an aircraft engine.

BACKGROUND OF THE INVENTION

Harris Corporation developed a Wireless Engine Monitoring System (WEMS) module that monitors aircraft engines in real-time without resorting to a larger ground data link unit that interfaces with many aircraft systems. The WEMS module is disclosed in commonly assigned U.S. Pat. Nos. 6,943,699; 7,456,756; 7,595,739; 7,755,512; and 9,026,336; the disclosures which are hereby incorporated by reference in their entirety. In one example, the WEMS module transmits its engine data to a Cabin Wireless LAN Unit (CWLU) for further processing at the flight deck or for transmission via a satellite to a ground based engine service provider.

The WEMS module is interfaced in one example to the Full Authority Digital Engine Controller (FADEC)/Engine Control Unit (ECU) and mounted on the engine, and can record, store, encrypt and transmit "full flight" engine data by recording hundreds of engine parameters, for example, with a one second or less sampling frequency. It has a preferred conformal antenna and RF transceiver to download (and upload) data using RF/802.11/cellular techniques, including other spread spectrum techniques as non-limiting examples.

This collection and storage of "full flight" engine data using the WEMS module allows advanced prognostics and diagnostics on the engine and increases engine "time-on-wing" (TOW) and decreases engine maintenance cost per hour (MCPH). The WEMS data is downloaded in one example using a RF/(802.11) spread spectrum/cellular signal to an airport server for processing and/or transported over the internet, PSTN, cellular or other communications network to another workstation for post flight analysis. Data can also be uploaded to the WEMS module, including algorithms for on-board processing. The WEMS module provides an automated wireless solution installed directly on the engine, recording full flight engine data for both large and small turbine engines in large megabyte files and using a high speed data link to extract.

Recently, the Federal Aviation Administration (FAA) has been working with airlines to identify pollutants emitted from aircraft engines and study their impact on the environment and climate change. Aircraft engines emit carbon dioxide ($CO_2$), water vapor ($H_2O$), oxides of nitrogen such as nitrogen oxide or dioxide, oxides of sulfur, carbon monoxide (CO), partially combusted or unburned hydrocarbons (HC), particulate matter (PM), and other compounds and pollutants. Many of these compounds and pollutants are emitted by aircraft close to the surface of the earth, for example, less than 3,000 feet above ground level. Excessive carbon monoxide and some hydrocarbons are produced when the aircraft engines are operating at their lowest combustion efficiency, for example, while wheels are on the ground at initial take-off or landing. The greater quantities of aircraft engine emissions and pollutants are emitted at the airport or just after or before landing at the airport. For this reason, many civil aviation authorities require monitoring of these aircraft engine emissions. Some countries have even suggested that fines be imposed on aircraft companies that emit pollutants that exceed a threshold when the aircraft is in their area.

Related to these issues of reducing aircraft emissions are the safety-related applications of the numerous sensors contained within the aircraft and ensuring redundant operation in cases of emergency. An aircraft has redundant wiring that adds weight to the aircraft, which in turn increases pollutants emitted from the aircraft engine. This also creates a point of failure since there are large numbers of redundant wires. For that reason, new standards have been developed for a Wireless Avionics Intra Communications (WAIC) system to allow wireless radio communication between two or more points on a single aircraft while also communicating with integrated wireless and/or installed components in the aircraft, such as wireless sensors. A WAIC is based on short range radio technology having distances usually less than 100 meters and low transmit power levels of 10 milliwatts for low rate data communications and 50 milliwatts for high rate data applications. WAIC systems provide dissimilar redundancy, fewer wires and reduced connector pin failures. These systems also lower the risk of cracked insulation and broken conductors, and permit mesh networking between gateway network nodes that communicate with wireless sensors, including displays and activators, and provide communication redundancy in emergencies when wired connectors fail. The reduced wiring and resultant reduced aircraft weight also enables less fuel burn, helping to reduce emissions and meet more stringent environmental standards and thresholds required by some jurisdictions. The WAIC systems may also increase reliability by reducing the amount of aged wiring, simplifying and reducing the life-cycle cost of airplane wiring, and obtaining more data from aircraft systems and surfaces with new wireless sensors.

SUMMARY OF THE INVENTION

A monitoring system for an aircraft engine comprises a plurality of wireless engine sensors associated with the aircraft engine and each configured to sense an engine parameter as engine data relating to environmental engine emissions from the aircraft engine and transmit the engine data. An engine monitoring module comprises a housing configured to be mounted at the aircraft engine, a wireless transceiver carried by the housing and configured to receive the engine data from the engine sensors, a memory carried by the housing, and a processor carried by the housing and coupled to the memory and the wireless transceiver. The processor is configured to collect and store in the memory the engine data, and process the engine data and generate an alarm report when the environmental engine emissions exceed a threshold.

The engine data for the environmental engine emissions may comprise the exhaust concentration of at least one of total hydrocarbons (THC), total organic gases (TOC), particulate matter (PM), carbon monoxide (CO), sulfur dioxide, and oxides of nitrogen. The processor may be configured to process the engine data based on phase of flight of the aircraft and generate an alarm report when the environmental engine emissions exceed the threshold for a respective phase of flight. The phase of flight may include at least one of the aircraft's taxiing, take-off, climb, cruise, descent, final approach and taxiing.

The wireless transceiver may be configured to transmit the alarm report into the aircraft. At least one communications device may be positioned within the flight deck that receives the alarm report and includes a display configured to display the alarm report to the crew in the flight deck. The engine parameters may comprise data regarding the sensed exhaust gas temperature (EGT) of the aircraft engine during flight, and the processor may be configured to generate the alarm report when the EGT exceeds a threshold. The plurality of engine sensors may comprise a sensor configured to measure the particle emissions in the exhaust plume of the aircraft.

A ground based receiver may receive the engine data relating to the environmental engine emissions. A processor may be coupled to the ground based receiver and configured to correlate the engine data relating to the environmental engine emissions to the phase of flight of the aircraft engine and perform an analysis to determine a maintenance schedule for the aircraft engine. The processor may be configured to perform an analysis of the data relating to the environmental engine emissions based on the phase of flight of the aircraft engine using a Bayesian network. The plurality of wireless engine sensors may be configured to sense a low compressor speed (N1), a high compressor speed (N2), engine oil pressure, engine oil temperature and fuel flow of the aircraft engine. The plurality of wireless engine sensors may also be configured to measure at least one of barometric pressure, air moisture content, wind speed, and air temperature.

A monitoring system for an aircraft engine comprises an engine monitoring module comprising a housing configured to be mounted at the aircraft engine, a wireless transceiver carried by the housing, a memory carried by the housing, and a processor carried by the housing and coupled to the memory and the wireless transceiver. The processor is configured to collect and store in the memory engine data relating to a plurality of engine parameters sensed during operation of the aircraft engine by a plurality of engine sensors. A ground based receiver may be configured to receive the engine data from the wireless transceiver. A processor may be coupled to the receiver and configured to receive the engine data, correlate the engine data to the phase of flight of the aircraft engine, and perform an analysis to determine a maintenance schedule for the aircraft engine.

The processor may be configured to perform an analysis of the engine data using a Bayesian network. The Bayesian network may comprise a decision tree having variables comprising ranges of engine performance parameters. The engine performance parameters may comprise engine data relating to environmental engine emissions from the aircraft engine. The engine data for the environmental engine emissions may comprise the exhaust concentration of at least one of total hydrocarbons (THC), total organic gases (TOC), particulate matter (PM), carbon monoxide (CO), sulfur dioxide, and oxides of nitrogen. The phase of flight may include at least one of the aircraft's taxiing, take-off, climb, cruise, descent, final approach and taxiing. The engine parameters may comprise engine data regarding the sensed exhaust gas temperature (EGT) of the aircraft engine during flight. The engine parameters may comprise engine data for a low compressor speed (N1), a high compressor speed (N2), engine oil pressure, engine oil temperature and fuel flow of the aircraft engine. The engine parameters may also comprise engine data for barometric pressure, air moisture content, wind speed, and air temperature.

An aircraft comprises a wireless sensor server contained within the aircraft and a plurality of aircraft compartments. Each aircraft compartment comprises a gateway network node comprising a wireless gateway transceiver, and a plurality of wireless sensors each connected to an aircraft component to be sensed. Each wireless sensor may comprise a sensor transceiver configured to receive aircraft data from the sensed aircraft component and transmit the aircraft data to the wireless sensor server via the wireless gateway transceiver of the gateway network node within the respective aircraft compartment.

At least one of the aircraft compartments comprises an engine nacelle and an aircraft engine supported within the engine nacelle. The plurality of wireless sensors may comprise wireless engine sensors. The gateway network node contained within the engine nacelle may comprise an engine monitoring module comprising a housing configured to be mounted at the aircraft engine, a wireless transceiver carried by the housing and configured to receive engine data from the wireless engine sensors, a memory carried by the housing, and a processor carried by the housing and coupled to the memory and the wireless transceiver and configured to collect and store in the memory the engine data and transmit the engine data to the aircraft sensor server.

Each wireless engine sensor may be configured to sense an engine parameter as engine data relating to environmental engine emissions from the aircraft engine. The engine data for the environmental engine emissions may comprise the exhaust concentration of at least one of total hydrocarbons (THC), total organic gases (TOC), particulate matter (PM), carbon monoxide (CO), sulfur dioxide, and oxides of nitrogen. The aircraft may comprise an existing on-board communications network. Each gateway network node may be connected to the existing on-board communications network. The existing on-board communications network at the engine nacelle may comprise a Full Authority Digital Engine Controller/Engine Control Unit (FADEC/ECU) connected to the engine monitoring module. The existing on-board communications network may comprise an avionics data bus. An aircraft component may comprise an actuator or display.

The plurality of aircraft compartments may comprise at least one of a flight deck, cabin compartment, avionics compartment, cargo compartment, bilge, engine nacelles, fuel tanks, vertical and horizontal stabilizers, landing gear bays and flap members. The wireless sensor server may comprise a server processor and server memory. The server processor may be configured to store within the server memory the aircraft data received from each of the gateway network nodes. Each gateway network node may be configured in a multi-hop network configuration to communicate among each other and the wireless sensor server and wireless sensors using a wireless communications protocol. The wireless communications protocol may comprise at least one of Time Division Multiple Access (TDMA), Frequency Division Multiple Access (FDMA), Code Division Multiple Access (CDMA), Space Division Multiple Access (SDMA), and Orthogonal Frequency-Division Multiplexing (OFDM).

A monitoring system for an aircraft engine comprises an engine monitoring module having a housing configured to be mounted at the aircraft engine, a wireless transceiver carried by the housing, a memory carried by the housing, and a processor carried by the housing and coupled to the memory and the wireless transceiver. The processor is configured to collect and store in the memory engine data relating to a plurality of engine parameters sensed during operation of the aircraft engine by a plurality of engine sensors and transmit the engine data into the aircraft. An engine controller is coupled to the aircraft engine and configured to control engine operating parameters. The engine controller is configured to receive the engine data transmitted from the engine monitoring module and receive current weather forecasting data and process the engine data and current weather forecasting data and change engine operating parameters during flight based on predicted flight operations caused by weather changes.

The engine controller may be contained within the flight deck of the aircraft. The sensed engine parameters include environmental engine emissions comprising the exhaust concentration of at least one of total hydrocarbons (THC), total organic gases (TOC), particulate matter (PM), carbon monoxide (CO), sulfur dioxide, and oxides of nitrogen. The engine controller may be configured to process the engine data based on phase of the flight of the aircraft. The phase of flight may include at least one of the aircraft's taxiing, take-off, climb, cruise, descent, final approach and taxiing. The sensed engine parameters may comprise data regarding the sensed exhaust gas temperature (EGT) of the aircraft engine during flight. A sensor may be connected to the engine controller and configured to measure the particle emissions in the exhaust plume of the aircraft.

BRIEF DESCRIPTION OF THE DRAWINGS

Other objects, features and advantages of the present invention will become apparent from the detailed description of the invention which follows, when considered in light of the accompanying drawings.

FIG. 13 is a chart showing aircraft engine emissions data and derived emission factors that may be used to determine a threshold for aircraft engine emissions.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

In accordance with a non-limiting example, the WEMS module may be used in an aircraft monitoring system as a gateway network node that communicates with other gateway network nodes in a multi-hop network configuration and communicates with a wireless sensor server and wireless sensors using a wireless communications protocol.

The WEMS module may also be used with the aircraft engine alone and process and store engine parameters as engine data relating to environmental engine emissions from the aircraft engine and process that engine data. It may generate an alarm report when the environmental engine emissions exceed a threshold. For example, when the aircraft approaches an airport, the WEMS module may signal the pilot through an alarm report that the environmental engine emissions have exceeded a threshold for that airport or jurisdiction and engine adjustments may be made to stay within the emission guidelines established by that jurisdiction or airport. Also, the engine parameters, including the environmental engine emissions, may be stored and downloaded to a ground based receiver such as located at an engine service provider. The engine data may be correlated to the phase of flight and an analysis, such as a probability analysis, performed to determine a maintenance schedule for the aircraft engine, for example, using a Bayesian network.

It is also possible to process weather forecasting data with the engine data from the WEMS module, for example, in an engine controller that is coupled to the aircraft engine and configured to control engine operating parameters. The engine controller may be positioned at the flight deck and processes the engine data and current weather forecasting data and change engine operating parameters during flight based on predicted flight operations caused by weather changes. This could include sensing environmental engine emissions and processing engine data based on phase of the flight of the aircraft. It is possible to measure the Exhaust Gas Temperature and correlate that with sensed carbon emissions and determine carbon credit data. Also, it is possible to monitor real time and full flight engine data obtain from the WEMS module and measure carbon emissions to determine carbon credits.

Figure 1:
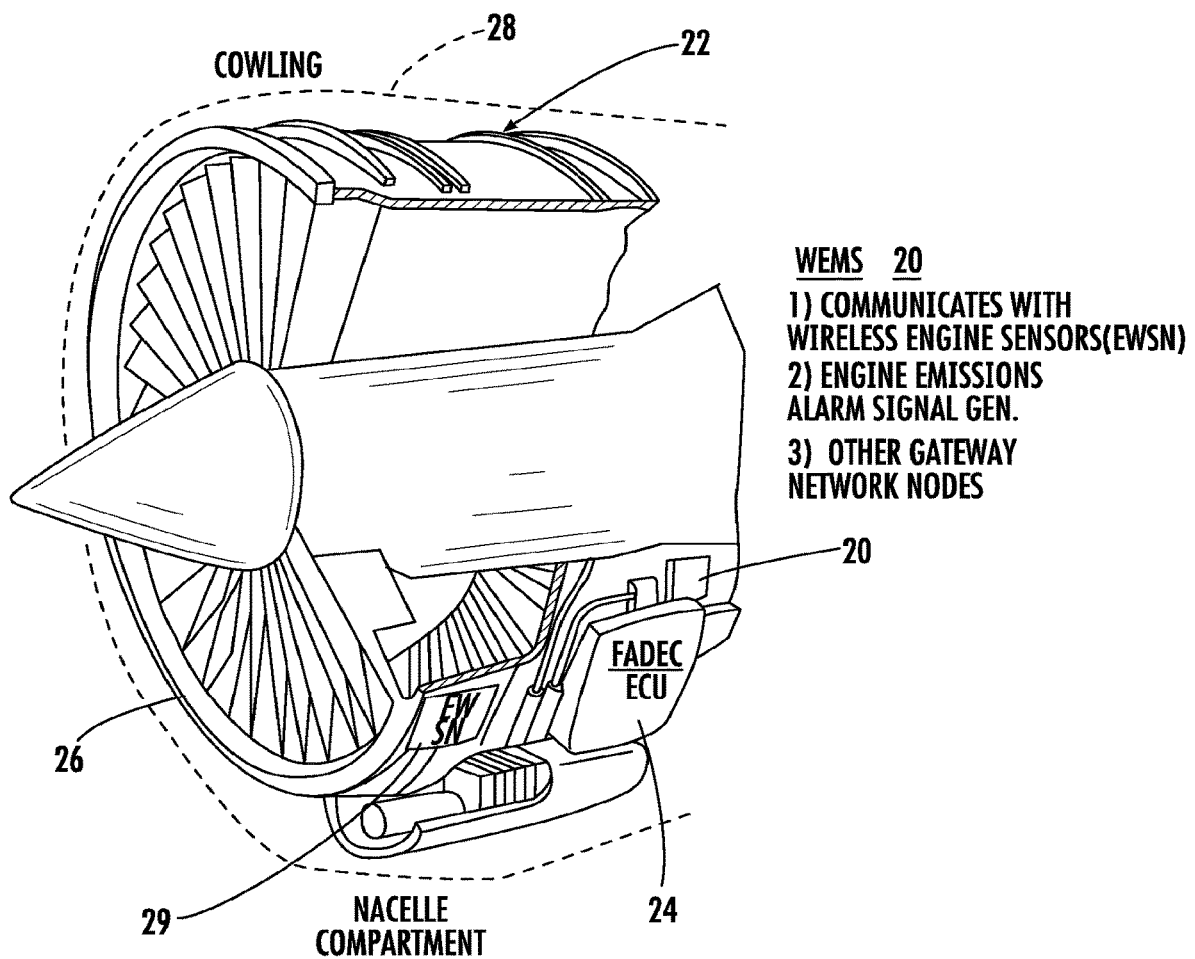
FIG. 1 is a partial fragmentary, isometric view of a jet engine showing the WEMS module mounted on the engine and interfaced with the FADEC/ECU in accordance with a non-limiting example.

Referring now to FIG. 1, the WEMS module 20 is mounted directly on the jet engine 22, and in an example, electrically connected to the FADEC/ECU control unit 24, which is also mounted on the jet engine. The jet engine 22 shows basic elements of the turbine 26 and other components. The jet engine cowling, also referred to as the nacelle 28, is shown in dashed lines and is a separate compartment. The WEMS module 20 is disposed within the cowling, and as explained in greater detail below, may operate as a gateway network node in an aircraft monitoring system as part of a Wireless Avionics Intra Communications (WAIC) system. The WEMS module 20 may include the basic functional RF and memory components, such as disclosed in the ground data link unit and engine monitoring system of commonly assigned U.S. Pat. Nos. 6,047,165; 6,148,179; and 6,353,734, the disclosures which are hereby incorporated by reference in their entirety. The WEMS module can be mounted at different locations on the engine depending on the type of preferred conformal antenna and the nature of the cowling 28, i.e., nacelle, used in the jet engine.

The WEMS module 20 not only may operate as a gateway network node, but it may also generate an alarm report when environment engine emissions exceed a threshold. The WEMS module 20 also may communicate back-and-forth with a wireless sensor array shown generally at 29 in FIG. 1. The WEMS module 20 as a gateway network node communicates not only with other gateway network nodes positioned in other aircraft compartments, but also with individual wireless sensors forming the wireless sensor array 29.

Figure 2:
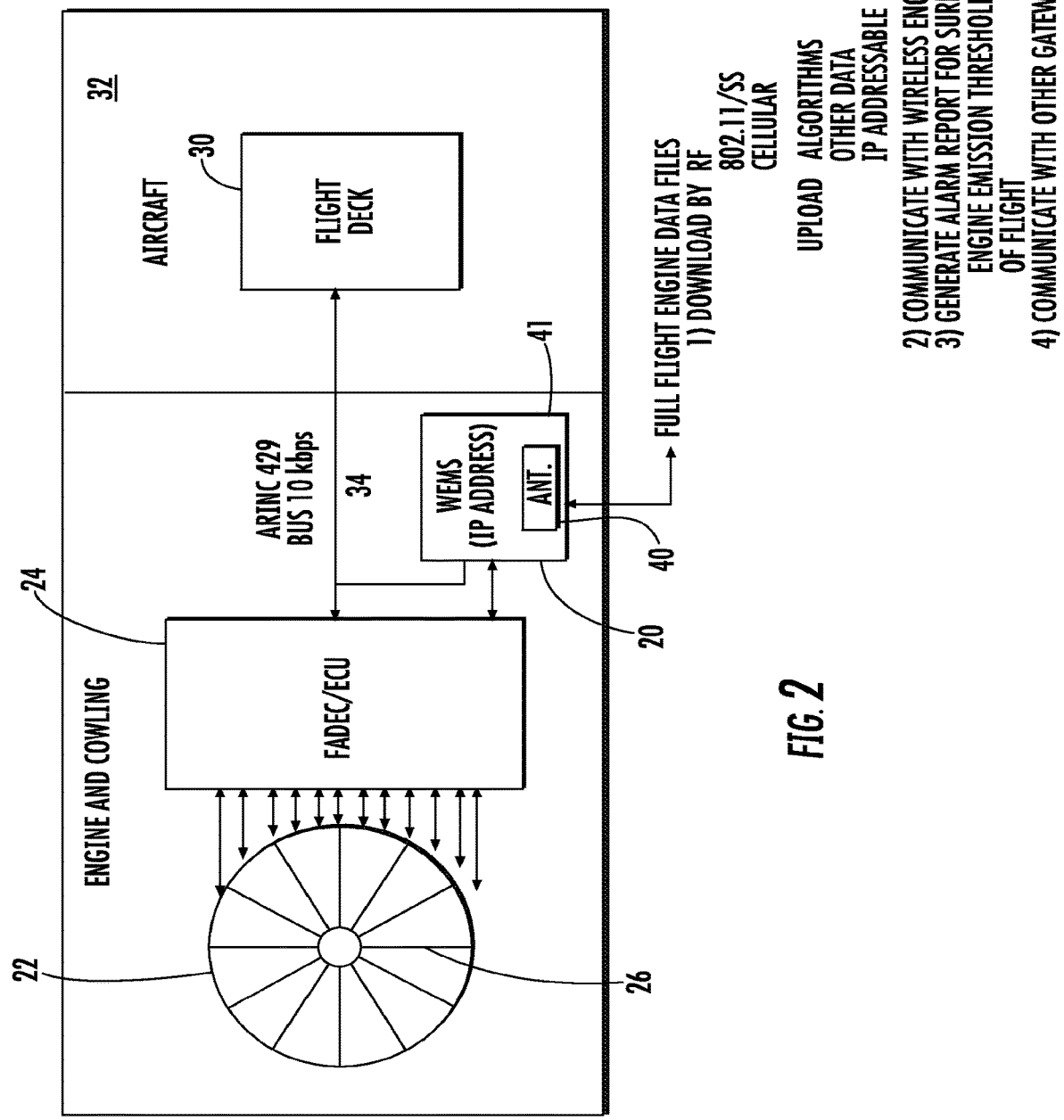
FIG. 2 is a block diagram showing the WEMS module interfaced with the FADEC/ECU for downloading full flight engine data files and uploading algorithms and other data in accordance with a non-limiting example.

Referring now to FIG. 2, a basic block diagram of a FADEC/ECU 24 that is operative as a bidirectional multiplexer for signals to and from the jet engine 22 is illustrated. The signals include analog and digital signals and the FADEC/ECU 24 gives commands to the engine from the flight deck 30 of the aircraft 32. It also transmits engine status and health signals. Many signals are processed by the FADEC/ECU 24, which then transmits the signals over an ARINC 429 bus 34 in this non-limiting example at typically 10 kilobits per second to and from the flight deck 30.

The WEMS module 20 in one example includes a separate data address as an IP address (for each module), which is linked to the serial number of the engine. The WEMS module 20 is mounted on the engine and interfaces with the FADEC/ECU 24 such as through another port on the FADEC/ECU or directly into the ARINC 429 bus 34. The radio frequency transceiver capability is built into the WEMS module 20 and is operative for recording, compressing and encrypting full flight data files. The WEMS module 20 typically will use a conformal antenna 40 that is formed in one example as a small patch antenna the size of a postage stamp, for example, mounted on the housing, i.e., the casing 41, that forms a protective housing for the WEMS module 20. Although a conformal antenna is preferred, a separate antenna could possibly be used depending on the cowling and engine type on which the WEMS module 20 is mounted. A separate antenna could be mounted on a separate location on the fuselage or other location for enhancing communication.

The WEMS module 20 can use an archival data store for recording, storing and encrypting and then later transmitting "full flight" engine data. The WEMS module 20 can record hundreds of engine parameters with a preferred one second sampling frequency in one example. This sampling frequency may be modified as explained in greater detail below. The WEMS module 20 thus allows advanced prognostic and diagnostic techniques to increase engine "time on wing" (TOW) and decrease engine maintenance costs. For example, the WEMS module 20 could be operative with jet engine diagnostic cells, such as used with prognostic and health management applications, including those designed by Impact Technologies, LLC of Rochester, N.Y.

The WEMS module 20 can download engine data by almost any type of radio frequency signal, including spread spectrum modulation techniques. The WEMS module 20 could be operative with cellular, internet, or PSTN communication infrastructures to download full flight engine data files and upload algorithms or other data or programs. Each WEMS module will typically include a separate Internet Protocol (IP) address such that it can be separately addressable for identification and upload and download of data. The WEMS module 20 may also communicate wirelessly with the wireless sensor array 29 and also operate as a gateway network node and receive engine data regarding environmental emissions. The engine data may also be downloaded to an engine service provider for further processing such as to determine maintenance schedules.

Figure 3:
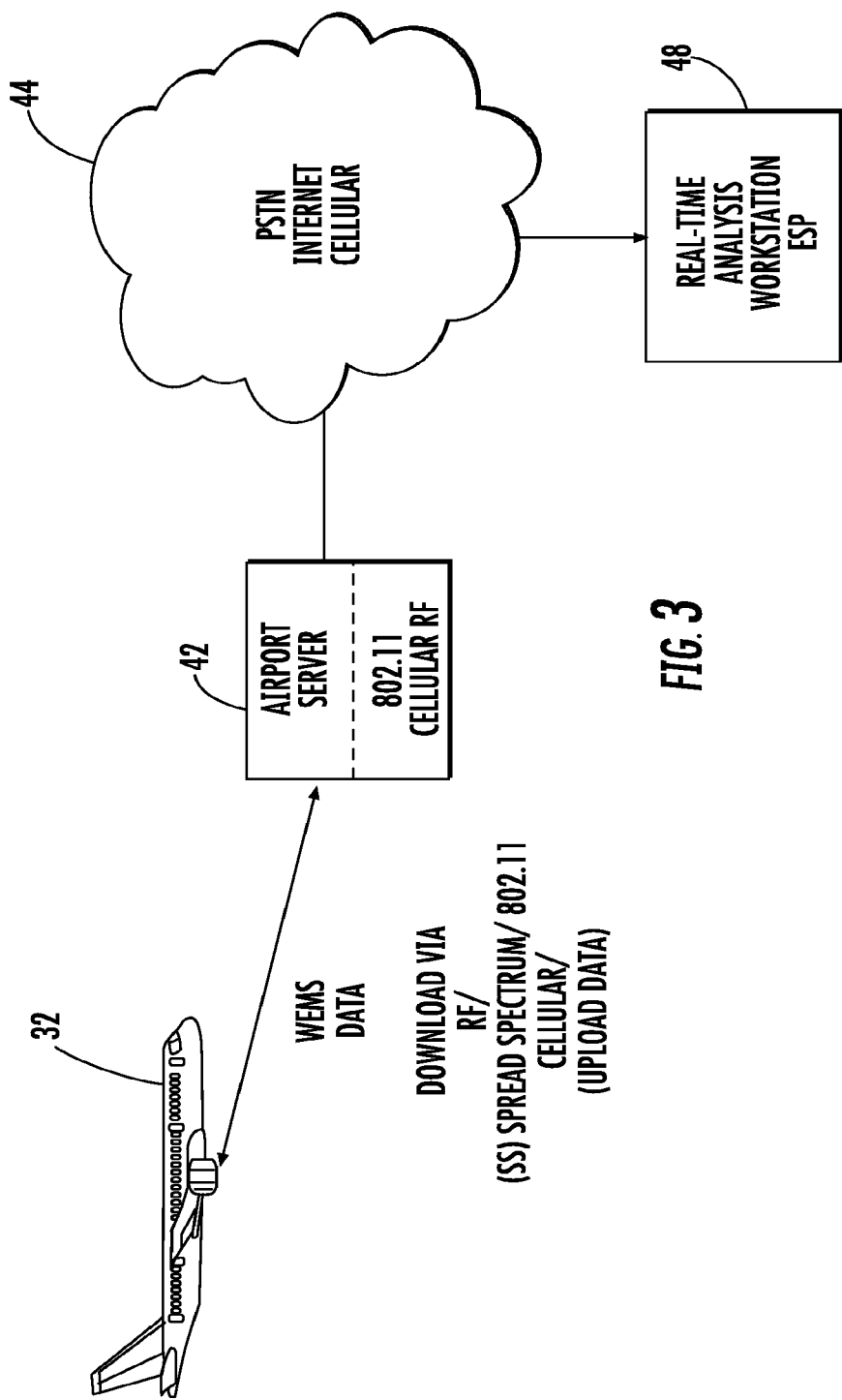
FIG. 3 is a block diagram showing WEMS engine data that may be downloaded to an airport server and transferred by PSTN, internet or cellular infrastructure to a real-time analysis workstation in accordance with a non-limiting example.

FIG. 3 shows a high-level block diagram of an aircraft 32 that includes a WEMS module 20 that downloads engine data and uploads data for on-board processing to and/or from an airport server 42, which could be operative with a communications network 44, such as a public switched telephone network (PSTN), the internet or a cellular infrastructure. The airport server 42 includes a receiver and transmitter and communicates through the communications network 44 to a post flight analysis workstation, for example, as provided by an engine service provider (ESP) 48 or other station having the processing capability to analyze the downloaded engine data, including emissions data, and determine the best maintenance program for the aircraft engine, and thus, extend the time the engine remains on the aircraft without removing the engine. The real-time analysis workstation at the ESP 48, for example, could be directly connected to the airport server or could receive engine data directly from the WEMS module 20.

During flight or as an aircraft approaches an airport, the WEMS module may process the engine data, including the environmental engine emissions as sensed by any wireless or wired sensors, and generate an alarm report when the engine emissions exceed a threshold. The alarm report would give notice to a pilot that the aircraft may be exceeding the emission limits in a specific jurisdiction and be able to modify their engine operation such as throttle back. Also, the real-time analysis workstation at the ESP 48 may take the engine data, including the engine emissions, and correlate the engine data to the phase of flight of the aircraft engine and perform an analysis to determine a maintenance schedule for the aircraft engine. The time-on-wing may also be taken into consideration. Maintenance may be required if the emissions cannot be lowered or if the emissions indicate that service or maintenance is required. The analysis may include using a Bayesian network as explained below, including a decision tree having variables comprising ranges of engine operating performance parameters related, in one example, to the engine emissions.

Figure 4:
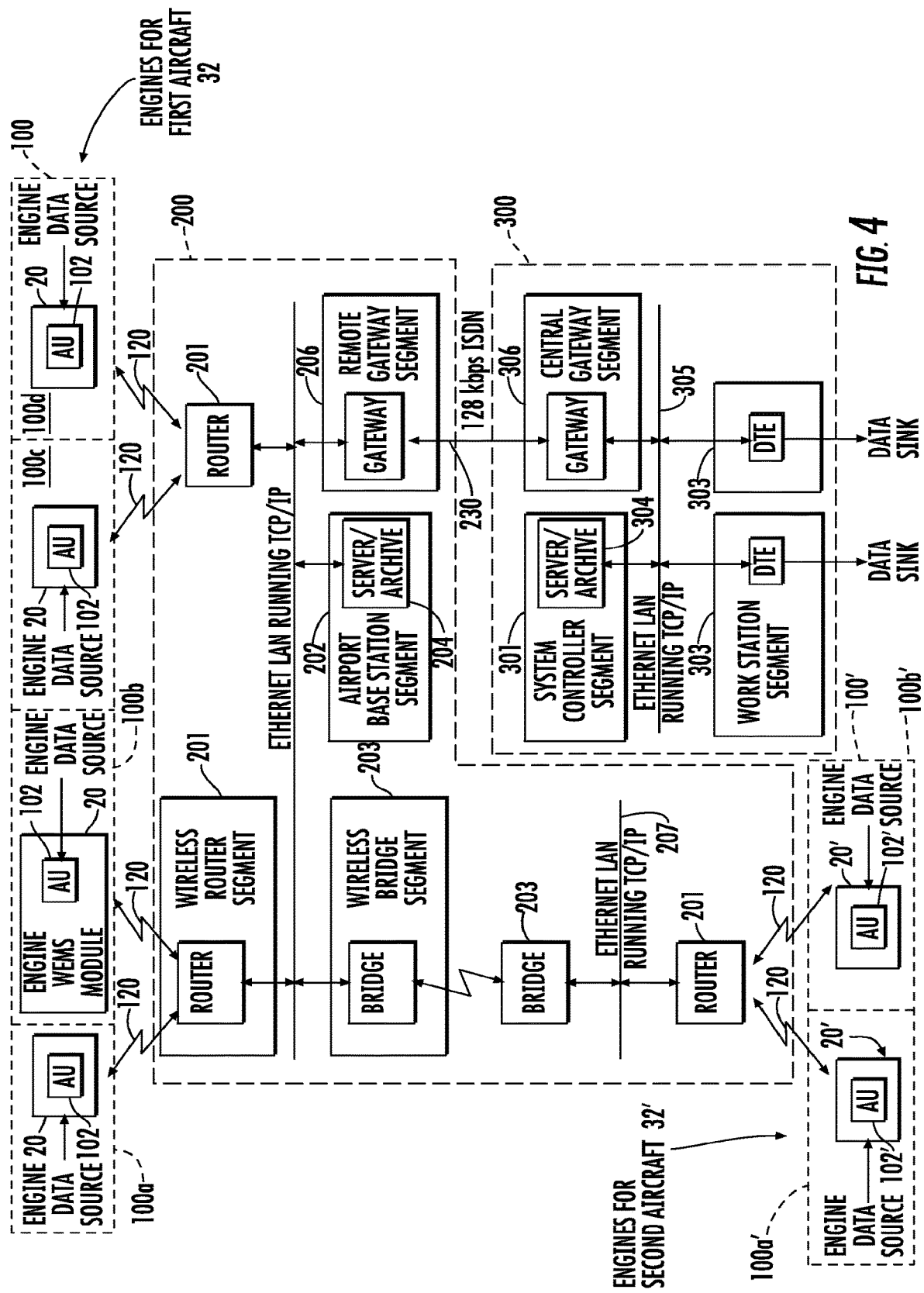
FIG. 4 is a block diagram showing a plurality of WEMS modules that communicate wirelessly with ground based systems in accordance with a non-limiting example.

Referring now to FIG. 4, there is shown a representative example of an overall communications system architecture for a wireless spread spectrum data communications system that can be used with the WEMS module 20. The architecture in this example has three interlinked subsystems: (1) an engine WEMS subsystem 100; (2) a ground subsystem 200 (typically airport based but not necessarily at the airport); and (3) a remote engine data control center 300 used for analyzing any downloaded engine data. The WEMS system 100 for one aircraft 32 could include a plurality of WEMS modules 20, each installed on an engine with four engines 100a-d illustrated. Two aircraft 32 and 32' are illustrated each with respective WEMS modules 20, 20'. Each WEMS module 20, 20' includes an airborne unit (AU) 102, 102', each which includes the processor, transceiver, memory and other necessary components. Each WEMS module 20, 20' is operative to communicate with a wireless router (WR) segment 201 of the ground subsystem 200 through a wireless communications link 120. The following description proceeds with reference to one aircraft 32 and WEMS module 20 for purposes of description.

The wireless router segment 201 routes the engine data files it receives from the WEMS module 20, either directly to an airport base station 202 via a wired Ethernet LAN 207, or indirectly through local area networks 207 and airport-resident wireless bridge segments 203 in this one non-limiting example. The wireless communication link 120 can be a spread spectrum radio frequency (RF) link having a carrier frequency lying in an unlicensed portion of the electromagnetic spectrum, such as within the 2.4-2.5 GHz S-band as one non-limiting example. The wireless communication link 120 could also be an RF, internet, cellular, or other link.

The ground subsystem 200 in this example includes a plurality of ground and/or airport-resident wireless router segments 201, one or more of which are distributed within the environments of the various airports served by the system. A respective ground and/or airport wireless router 201 is operative to receive engine data that is wirelessly down-linked from a WEMS module 20. Each ground subsystem wireless router 201 can forward engine data to a server/archive computer terminal 204 of a base station 202, which can reside on a local area network 207 of the ground subsystem 200 at an airport or other location.

The base station 202 can be coupled via a local communications path 207, to which a remote gateway (RG) segment 206 is interfaced over a communications path 230, to a central gateway (CG) segment 306 of a remote engine data control center 300, where engine data files from various aircraft are analyzed. As a non-limiting example, the communications path 230 can include an ISDN telephone company (Telco) land line, and the gateway segments can include standard LAN interfaces. Other communications networks, such as cellular, internet, or other wireless communications can be used. It should be observed that other communications media, such as a satellite links or cellular, for example, may be employed for ground subsystem-to-control center communications without departing from the scope of the invention.

The remote engine data control center 300 could include a system controller (SC) segment 301 and a plurality of workstations (WS) 303, which are interlinked to the systems controller 301 via a local area network 305. Engine safety, maintenance, and monitoring analysts are at the remote engine data control center 300 to evaluate the engine data files conveyed to the remote engine data control center 300 from the airport base station segments 202 of the ground subsystem 200. The respective workstations 303 may be allocated for different purposes.

The system controller 301 can have a server/archive terminal unit 304 that preferably includes database management software for providing for efficient transfer and analysis of engine data files, as it retrieves downloaded files from the ground subsystem. As a non-limiting example, such database management software may delete existing files from a base station segment's memory once the files have been retrieved.

Figure 5:
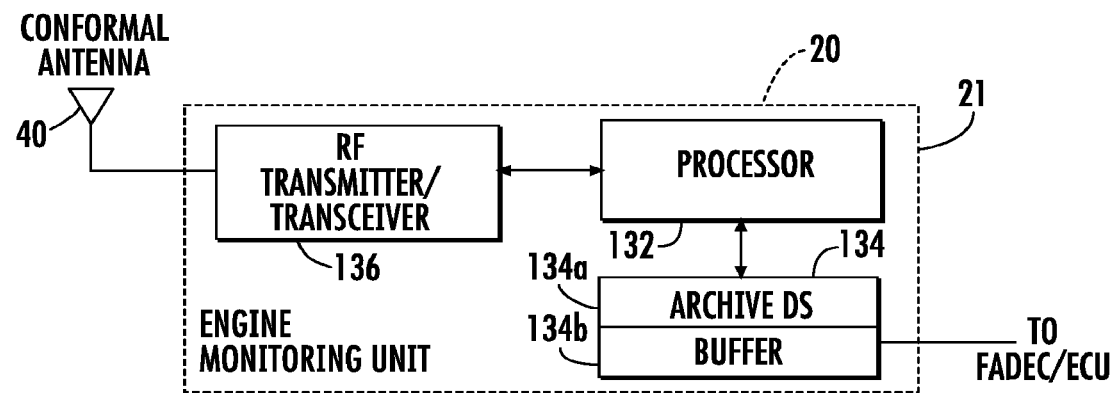
FIG. 5 is a high-level block diagram of the WEMS module showing basic functional components in accordance with a non-limiting example.

As described briefly above, and as diagrammatically illustrated in FIG. 5, each WEMS module 20 generally can include a housing 21 and bidirectional wireless (radio frequency carrier-based) subsystem containing a processing unit such as a microprocessor 132 and associated memory or data store 134, serving as both an archival data store 134a and a buffer 134b for communications, including packet communications. The memory 134 is coupled to the FADEC/ECU. Processing unit 132 can receive and compress the engine data and store the compressed data in its associated memory 134. A report can be generated by the processing unit 132, which includes many items of engine data and if a threshold is passed for emissions from the engine.

The engine data and reports can be downloaded via the RF transceiver 136 and its preferred conformal antenna 40. To provide bidirectional RF communication capability, the transceiver 136 is operative with the wireless router 201 shown in FIG. 4 for upload and download of data. Also, the WEMS module 20 may operate as a gateway network node and communicate wirelessly with the wireless sensor array 29 (FIG. 1) as further explained below.

If the RF communication link is spread spectrum, and a preferred 802.11 link, each of a plurality of sub-band channels of an unlicensed 2.4-2.5 GHz S-band segment of interest in this non-limiting example can be available and preferably used. Other unlicensed or licensed bands could be used. A wireless router 201 could continuously broadcast an interrogation beacon that contains information representative of the emitted power level restrictions at an airport. Using an adaptive power unit within its transceiver, the WEMS module 20 could respond to this beacon signal by adjusting its emitted power to a level that will not exceed communication limitations imposed by the jurisdiction governing the airport. The wireless (RF) transceiver 136 then accesses the engine data file stored in memory 134, encrypts the engine data and transmits the engine data file via a selected sub-channel of the wireless ground communications link to a wireless router 201.

The recipient wireless router 201 forwards the data file to the base station segment temporarily until the file can be automatically transmitted over the communications path 230 to the remote engine data control center 300 for analysis.

For purposes of reference, a jet engine is described with reference to FIGS. 6 and 7 on which the wireless engine monitoring system (WEMS) module 20 as described can be used. Each engine can have one engine mounted WEMS module 20 and each WEMS module can have a specific data address, such as an internet address or other IP address, to allow service providers to access the WEMS module and its data in near real-time and perform "intelligent" maintenance. This address is linked to the engine serial number and will be used to store routine and critical engine information. Use of the WEMS module can thus reduce engine maintenance cost per hour (MCPH).

Figure 6:
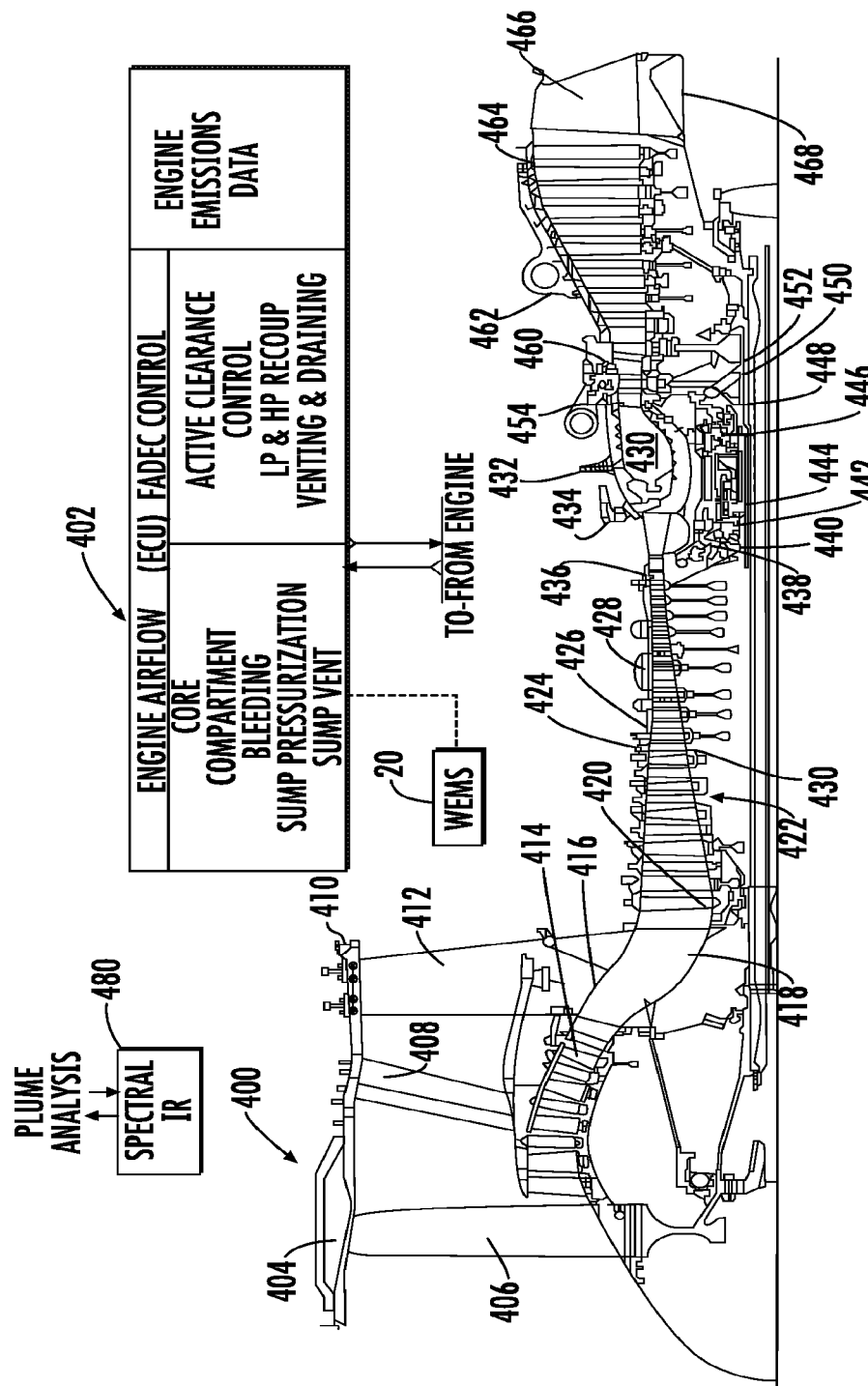
FIG. 6 is a cross-section of an example jet engine that generates engine events to be collected by wireless sensors, for example, and stored and transmitted from the WEMS module in accordance with a non-limiting example.

FIG. 6 illustrates one cross-section of a jet engine indicated generally at 400, showing basic components and engine air flow FADEC/ECU control 402 to and from the jet engine that can be used for real-time monitoring of engine events. These events could be downloaded during the first minute or so of initial take-off to a remote engine data control center 300 or saved to memory in the WEMS module and later downloaded to determine if "on wing" engine maintenance is warranted at the destination.

For purposes of clarity, reference numerals to describe this jet engine begin in the 400 series. As shown in FIG. 6, the engine air flow FADEC/ECU control 402 could include the core compartment bleeding; sump pressurization; sump venting; active clearance control; low pressure and high pressure recoup; and venting and draining functions. These functions could be monitored through basic FADEC/ECU control system 402, as known to those skilled in the art. The engine example in FIG. 6 corresponds to a General Electric CF6-80C2 advanced design with a FADEC/ECU or PMC control having an N1 thrust management and common turbo machinery. Although this jet engine is illustrated, naturally other control systems for different jet engines could be used, as known to those skilled in the art.

The engine as illustrated has six variable stages and a ruggedized stage one blade with a low emission combuster and 30 pressurized nozzles and improved emissions. It has a Kevlar containment to give a lower containment weight and a composite fan outer guide vane. It has an enhanced High Pressure Turbine (HPT) with a stage of one blade material and advanced cooling and active clearance control.

The fan module includes an aluminum/Kevlar containment 404 and a 93-inch improved aero/blade 406. It has compositive outer guide vanes 408 with an aluminum/composite aft fan case 410 and a titanium fan frame 412 for reduced losses. It additionally has a four stage orthogonal booster 414 and a variable bypass valve (VBV) between the fan struts (with 12 locations) 416. The engine includes a compressor inlet temperature (CIT) probe 418.

The high pressure compressor includes an IGV shroud seal 420 and a blade dovetail sealing 422 with a trenched casing of stages 3-14 424. The compressor includes a vane platform sealing 426 and a short cord stage 8 low loss bleed system 428 and improved rubcoat reduced clearances 430.

The compressor rear frame includes a combuster 430 and igniter plug 432 with a fuel nozzle 434 and outer guide vane 436. It includes a vent seal 438 and 4R/A/O seal 440 and 4R bearing 442 and 4B bearing 444. It also includes a 5R bearing 446 and 5R/A/O seal 448, a diffuser 450 and pressure balance seal 452. The compressor rear frame also includes a stage 1 nozzle 454.

The high pressure turbine area includes an active clearance for control stages 1 and 2, and coated shrouds indicated at 456. It also includes directionally solidified stage 1 blades and damped blades 458 and a cooling air delivery system. The high pressure turbine includes a thermally matched support structure, and an active clearance control and simplified impingement with a cradled vane support and linear ceiling. The improved inner structure load path has improved roundness control, solid shrouds and improved ceiling. These components are located in the area generally at 460 of the high pressure turbine area.

Low pressure turbine technology area includes a clearance control 462, a 360° case 464, aerodynamic struts 466 that remove swirl from the exit gas and a turbine rear frame 468 formed as a one piece casting.

Many of these components include wireless engine sensors and structural force sensors that generate signals during initial take-off and throughout flight. Signals can be relayed via the WEMS module 20 to an on-ground maintenance crew and/or separate remote engine data control center having its own processor and data analytics for advanced analysis.

Figure 7:
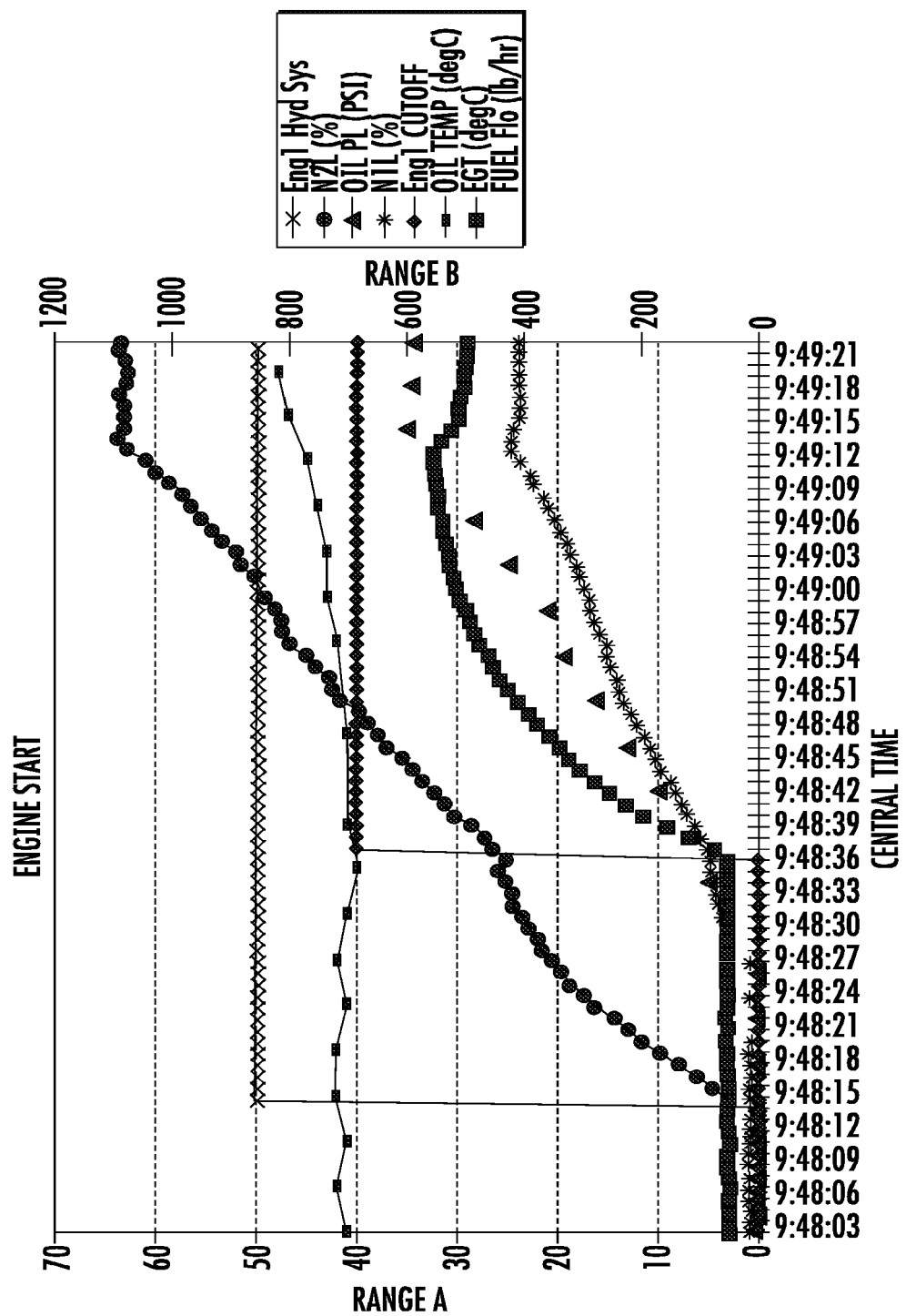
FIG. 7 is a chart showing various jet engine event reports at engine start and during flight that could be monitored by the WEMS module in accordance with a non-limiting example.

FIG. 7 illustrates components that were monitored during engine start in one example, including the engine hydraulic system, the oil pressure (psi), the engine cut-off switch, oil temperature (deg C.), fuel flow (lb/hr), the N2L and N1L both in percentage terms, oil temperature and EGT, both in centigrade, and $W_f$. Some of the ranges are shown on the vertical axis of the graph, while time is shown on the horizontal axis of the graph.

In accordance with a non-limiting example and as described in further detail below, the environmental engine emissions may be sensed and processed within the WEMS module 20, which generates an alarm report when the environmental engine emissions for individual or combined components such as total hydrocarbons exceed a threshold. In one non-limiting example, the threshold could be established by the International Civil Aviation Organization (ICAO) for specific countries or general international standards of emissions from aircraft engines during different phases of flight. The engine data for the environmental engine emissions could be sensed by other sensors so that in a non-limiting example the exhaust concentration of at least one of the total hydrocarbons (THC), total organic gases (TOG), particulate matter (PM), carbon monoxide (CO), sulfur dioxide, and oxides of nitrogen may be established. Individual component hydrocarbons and other organic gases may be sensed.

An infrared laser and associated sensor or other plume analysis device 480 (FIG. 6) may be used to detect plume emissions or other techniques may be used for analyzing the plume originating from the aircraft exhaust and determine more accurately in conjunction with the wireless or wired engine sensors the environmental engine emissions from the aircraft. Specific sensors may be used to measure emissions, including sensors for measuring nitrogen dioxide ($NO_2$), nitric acid ($HNO_3$), and ammonium nitrate ($NH_4NO_3$) particles and other particulate matter and inorganic or organic compounds at the immediate jet engine exhaust or within the plume. This will allow early identification of engines that exceed the ICAO limits.

Figure 8:
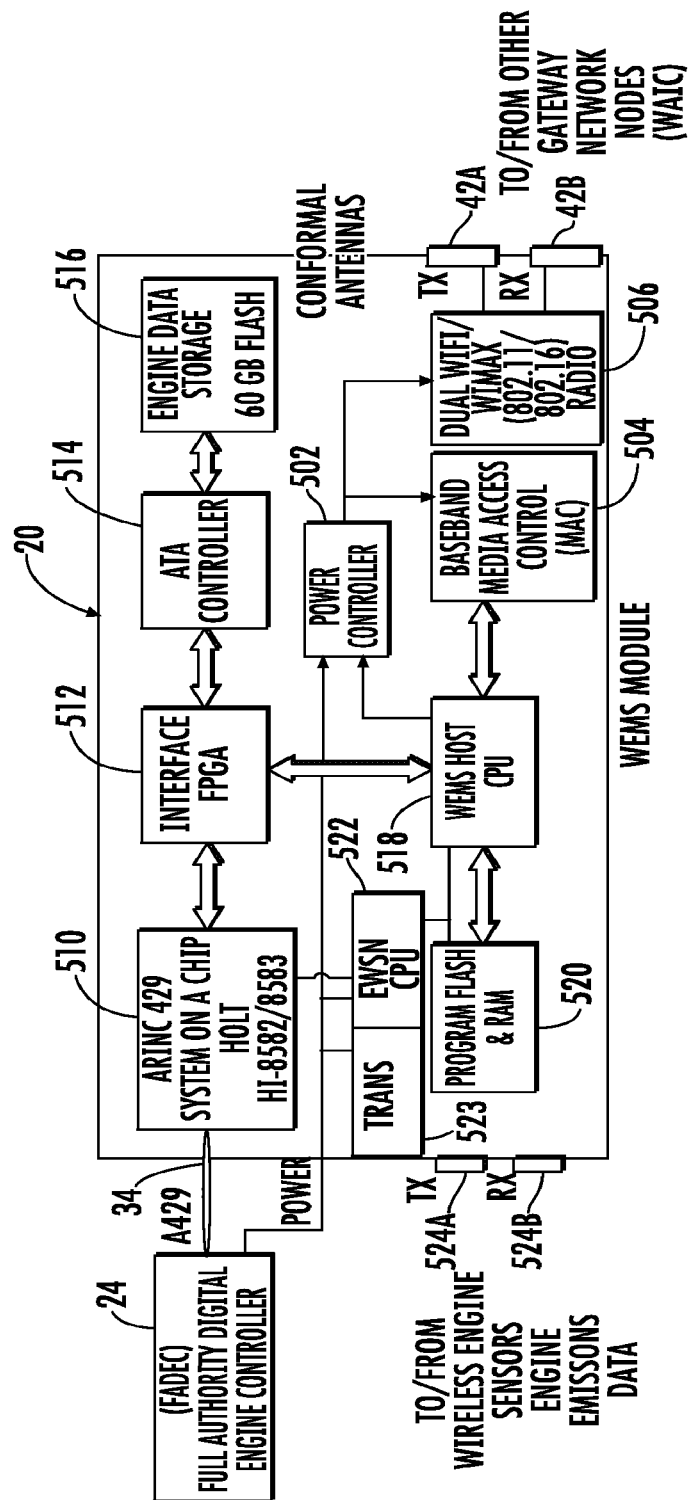
FIG. 8 is a block diagram of the WEMS module showing details of the module components for communicating with wireless sensors and operating as a gateway network node in accordance with a non-limiting example.
Figure 9:
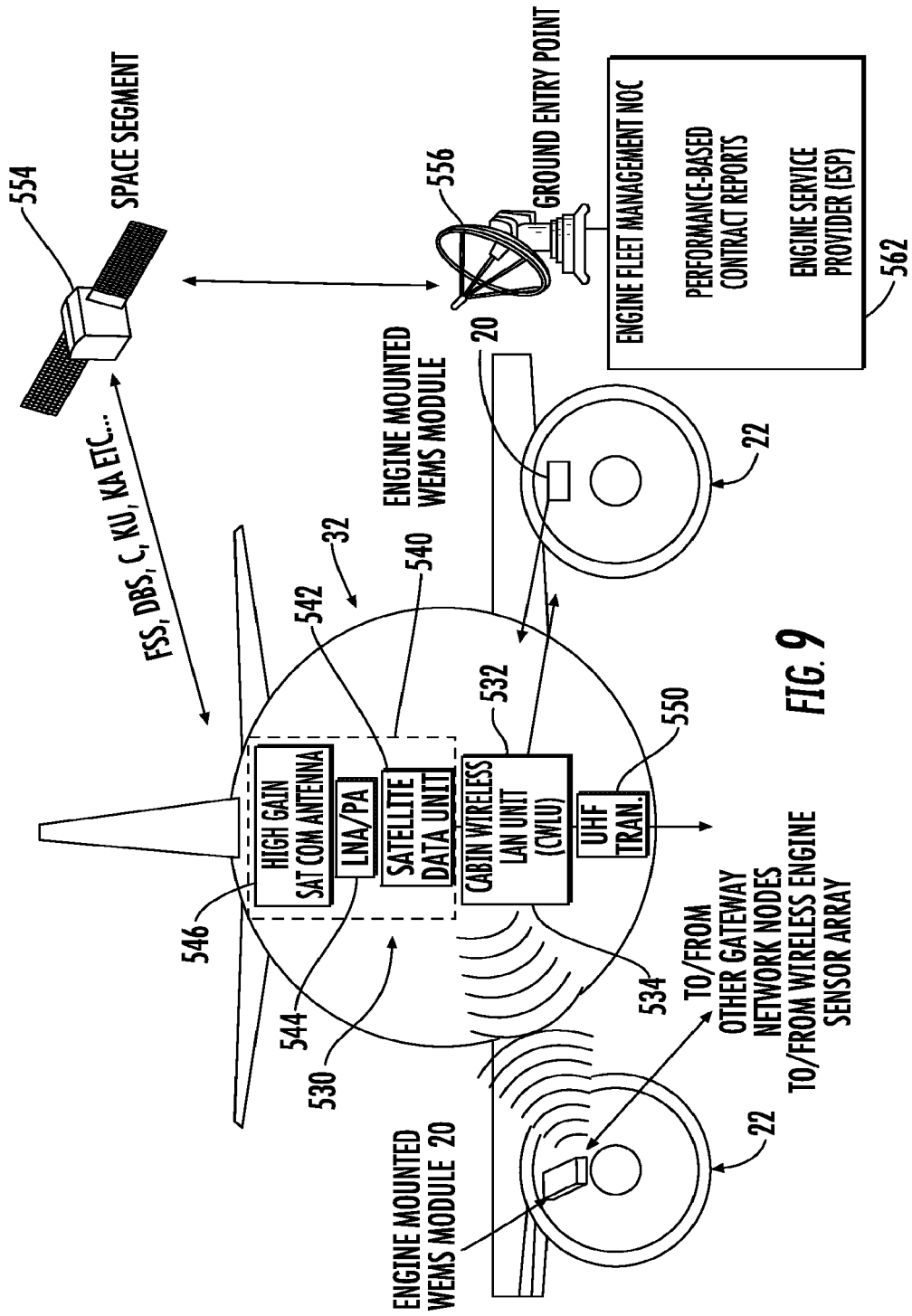
FIG. 9 is a partial fragmentary view of an aircraft and its engines and the WEMS module transmitting engine data to a cabin wireless LAN unit in accordance with a non-limiting example.
Figure 10:
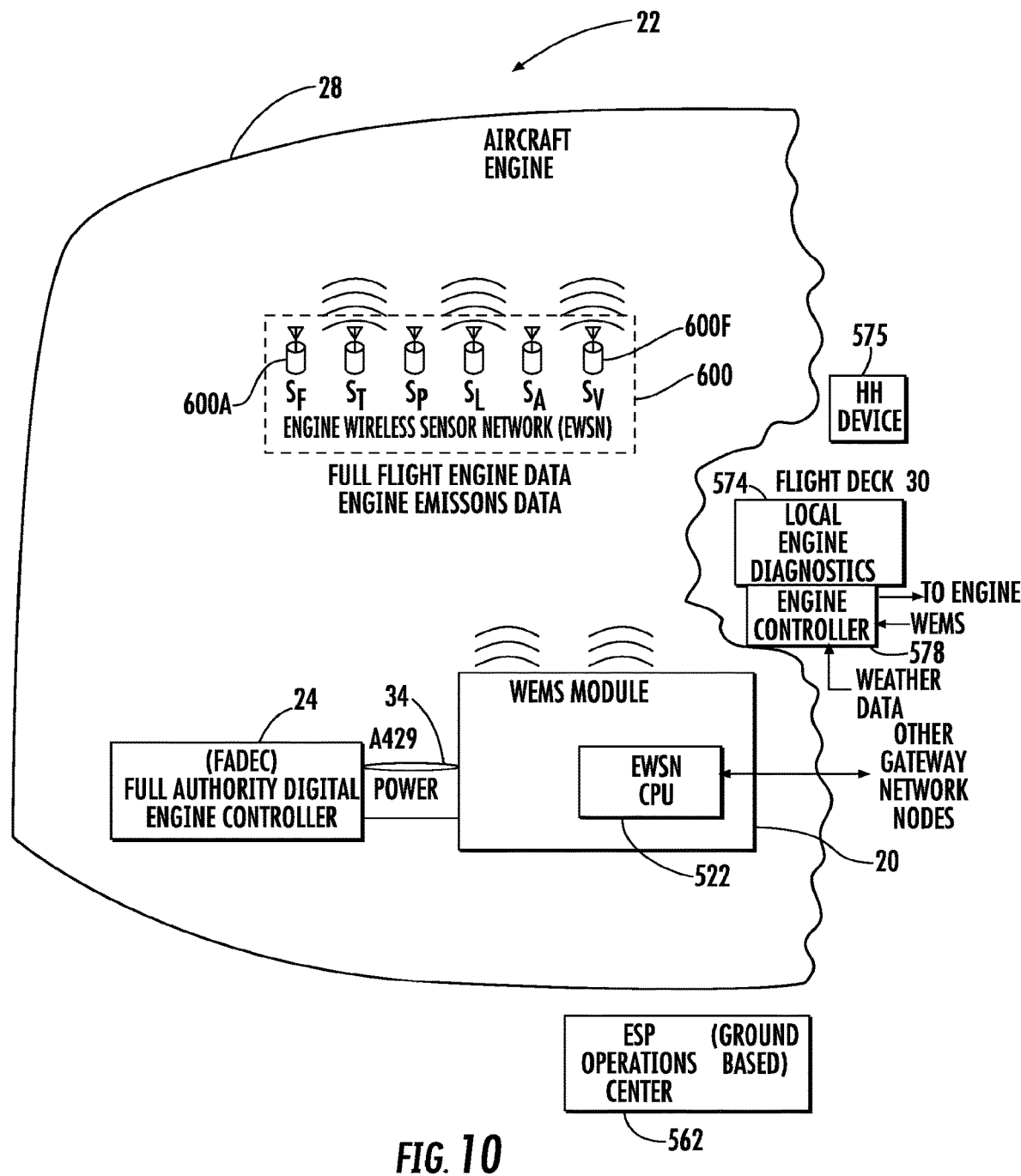
FIG. 10 is a block diagram showing the WEMS module that communicates with an Engine Wireless Sensor Network (EWSN) and Engine Service Provider (ESP) operations center in accordance with a non-limiting example of the present invention.

There is now described relative to FIGS. 8-10 the WEMS module that may also communicate as a gateway network node in multiple-hop communication with other gateway network nodes located in other engine compartments and communicate with an engine wireless sensor network (EWSN), for sampling wireless engine sensors at different sampling rates, and for generating an alarm report if emissions from the engine exceed a threshold, for example, as established by the ICAO and for determining a maintenance schedule for the engine. For purposes of description, reference numerals begin in the 500 series. The reference numerals for the WEMS module 20, jet engine 22, FADEC/ECU control unit 24, jet engine cowling or nacelle 28, flight deck 30 at the cabin, aircraft 32, ARINC 429 bus 34, conformal antenna 40, and casing 41 (housing) remain the same throughout the description with similar reference numerals.

FIG. 8 is a block diagram of the WEMS module 20 similar to that shown in FIG. 5, but showing greater details of different functional components and subcomponents that can be used in accordance with a non-limiting example. The FADEC 24 interfaces with the WEMS module 20 and provides power to a power controller 502 in the WEMS module that interoperates with a baseband Media Access Control (MAC) circuit 504 and dual WiFi/WiMAX radio 506, which in turn operates as a transceiver in accordance with 802.11 and 802.16 standards. In one example, it is a first wireless transmitter. This transceiver (radio) 506 could operate with other standards, however, to transmit and receive data through the conformal antennas, which in this example, correspond to a transmit (Tx) conformal antenna 42a and receive (Rx) conformal antenna 42b.

The FADEC 24 communicates over the ARINC 429 bus 34 with a processor 510, which in this non-limiting example corresponds to a system on a chip (SOC) such as a Holt HI-8582/8583 integrated circuit chip. This chip interoperates with an interface Field Programmable Gate Array (FPGA) 512, which interoperates with an ATA controller 514 and engine data storage 516, for example, a 60 GB flash memory. The interface FPGA 512 interoperates with a processor as a WEMS host CPU 518, which in turn, interoperates with the program flash and RAM 520 and the baseband media access control circuit 504. An associated Engine Wireless Sensor Network (EWSN) Central Processing Unit (CPU) 522 and transceiver 523 can act as an interrogation unit and receiver for wireless engine sensors as explained below. The transceiver (radio) 523 can transmit and receive data through conformal antennas, such as the example illustrated at transmit (Tx) conformal antenna 524a and receive (Rx) conformal antenna 524b.

As illustrated, the receive conformal antenna 524b may receive engine data and environmental emissions data from wireless sensors and other sensors or devices such as infrared sensor and optics and receiver that sense the emissions at the engine itself and in the plume. The same data could be transmitted to the FADEC. The radio 506 could operate with different protocols in order to transmit and receive data with other gateway network nodes as explained in greater detail below.

In this system, no aircraft modification is required and no manual intervention is required after the WEMS module 20 is installed on the aircraft engine. As indicated below during flight, the WEMS module 20 acquires, stores and encrypts "full flight engine data" and can automatically and wirelessly download engine data during flight or post-flight. In accordance with a non-limiting example of the present invention, the WEMS module 20 can acquire significant quantities of data during flight and provide global "real-time" downloading of that acquired engine data such as using a communications protocol in conformance with ARINC 429. This is a technical standard for the avionics data bus used on most higher-end commercial and transport aircraft as a two-wired data bus and data protocol to support an avionics local area network (LAN). It is a self-clocking and self-synchronizing serial data bus with a transmit and receive on separate ports. The twisted pair wires provide for balanced differential communications signaling.

Each ARINC communications packet typically has a 32-bit value and five fields, including a parity bit, a sign/status matrix (SSM) to indicate whether a data field is valid, a normal operation (NO) to indicate that data in the word is considered to be correct data; a functional test (FT) to indicate that data is provided by a test source; a failure warning (FW) to indicate a failure that causes the data to be suspect or missing; and a no computed data (NCD) to indicate that data is missing or inaccurate. The SSM as a sign/status matrix can indicate the sign of the data or other orientation such as north/south or east/west. The ARINC 429 system on a chip circuit 510 such as the Holt integrated circuits HI-8582 or HI-8583 is a silicon gate CMOS device that interfaces a 16-bit parallel data bus directly to the ARINC 429 serial bus 24. The ARINC 429 processor 510 includes two receivers each with label recognition, 32×32 FIFO and an analog line receiver. Up to 16 labels can be programmed for each receiver.

FIG. 9 illustrates a fragmentary sectional view of an aircraft 32 and two aircraft engines 22, each having an engine mounted WEMS module 20 in accordance with a non-limiting example of the present invention. The aircraft 32 includes the flight deck 530 having a cabin wireless LAN unit (CWLU) 532 that operates as a wireless access point and receives communication signals from the WEMS module 20. The CWLU 532 interoperates with a satellite communications unit 540 that includes a satellite data unit 542, a low noise amplifier/power amplifier (LNA/PA) 544 and high gain satellite communications antenna 546. These components form a second wireless transmitter for a satellite communications link. The CWLU 532 also interoperates with a UHF transceiver 550 that can be used for air-to-ground communications such as the older Air-to-Ground Radiotelephone bands used on aircraft. The UHF transceiver also operates as a second wireless transmitter. Multiple hop communications is illustrated using the WEMS module 20, CWLU 532, and a satellite 554, which communicates with a ground entry point 556 user satellite dish such as a satellite receiving dish that receives data for an engine service provider (ESP) 562. During flight, the WEMS module 20 wirelessly connects to the cabin wireless LAN unit 532 and can download critical "in flight engine safety data" to the ESP 562 or have an on-board processor analyze the data. This data can support FAA ETOPS (Extended Twin Operations) for oceanic routes.

The satellite communication link provides "real-time" engine data transfers and supports critical engine decisions at the ESP or on-board, including "in flight engine shut downs" to determine if one of the engines should be shut down. Real-time analysis of aircraft engine data can be accomplished at the engine service provider 562, including performance-based contract reports for engine diagnostics, health and status of an aircraft engine, performance burns, time on wing and the environmental impact (carbon emissions) or on-board the aircraft. Satellite communications can include different communications signaling and protocols, including Direct Broadcast Satellite (DBS), the Fixed Satellite Service (FSS), Ku, Ka and C band communications.

Alternatively, the UHF transceiver 550 can be used for communications at 848-850 MHz and 894-896 MHz as part of the older telephone band that can connect to the terrestrial ground system. The system as shown in FIGS. 8 and 9 allows significant "high value" and "time critical" data to be downloaded during flight and provides global "real-time" downloading of engine data. The WEMS module 20 interfaces with resources commonly available on international flights, including the WiFi cabin wireless LAN unit 532 in accordance with non-limiting examples operating under the ARINC 763 standard, which applies to servers on board commercial aircraft, allowing a passenger to have an "office in the sky." Access can be provided to the airborne satellite communications that operate in accordance with the ARINC 741 standard using the satellite data unit 542 and other components as described. Airlines can now more closely monitor aircraft engine performance including meeting IAW ETOPS certification requirements that apply to twin engine aircraft on routes with diversion times more than 60 minutes using one engine and applies on routes with diversion times more than 180 minutes for airplanes with more than two engines. ETOPS is the acronym for Extended Twin Operations as defined by the U.S. Federal Aviation Administration (FAA) and allows the twin-engine airliners such as an AirBus A300 or Boeing 737 and up to Boeing 787 to fly the long distance routes that were previously off-limits to twin-engine aircraft.

The WEMS data as real-time aircraft engine data allows a flight crew to make a decision to do an in-flight check-up and if necessary shut down or adjust the engine thrust of an engine. Algorithms can be programmed into the WEMS module 20 or a processor at the flight deck or at a ground based ESP 562 to provide the processing to determine engine operating parameters based on the sensed engine data and determine if an in-flight shutdown should occur if certain engine operating parameters have been exceeded. Algorithms can be uploaded to the WEMS module 20 even during flight, allowing the WEMS module 20 to be configurable "on-the-fly." It is also possible to populate a request from the flight deck to the WEMS module 20 as to what exceedances are to be investigated and processed depending on environmental or other conditions. For example, it is possible to configure the WEMS module 20 to download only specific monitored parameters and data during flight instead of downloading a large amount of data. The WEMS module is thus configurable as to data collection, storage and transmission, including the exhaust emission. The WEMS module 20 is configurable and can be programmed from the flight deck or from an ESP 562. For example, if vibration occurs during flight, it is possible to increase the sampling frequency for various vibration engine sensors, while reducing the sampling frequency of other sensors such that more data is collected during flight concerning vibration statistics.

The WEMS module in one example operates in accordance with the IEEE 802.11 or IEEE 802.16 standards and is implemented with a Wireless Local Area Network (WLAN) 530 at a preferred 2.4 GHz frequency band. It also operates in the 3.6 and 5.0 GHz frequency bands. Over-the-air modulation techniques use the same basic protocol such as defined in the 802.11b and 8011 g protocols, typically using the 2.4 GHz ISM band, which divides each of the various bands into channels. For example, the 2.4000 through 2.4835 GHz band is divided into 13 channels that are spaced 5 MHz apart, with availability of the channels often regulated by each country. Thus, depending on worldwide geographical location of the aircraft, the WEMS unit 20 can communicate via its radio 506 on different channels and at different powers depending on jurisdictional requirements at the specific locale. Some of the channels can also overlap depending on local requirements. The data frames are typically divided into specific, standardized sections, which include a MAC header, payload, and frame check sequence (FCS). Different MAC headers and frame control fields can be used and subdivided into various subfields. These may be modified depending on the geographical location of the aircraft and local jurisdictional rule.

The 802.16 is a wireless broadband standard for a wireless metropolitan area network as a wireless MAN, commercialized under the name "WiMAX" (Worldwide Interoperability for Microwave Access). WiMAX standardizes the air interface and related functions with the wireless local loop. It requires a physical device layer (PHY) and operates with scalable OFDMA (Orthogonal Frequency Division Multiple Access) to carry data and support channel bandwidth between about 1.25 MHz and 20 MHz with about 2,048 subcarriers. It supports adaptive modulation decoding and an efficient 64 QAM coding scheme. In some instances, 16 QAM and QPSK can be used. The WEMS module 20 and other associated components of the system may include Multiple-in, Multiple-out (MIMO) antennas to provide non-line-of-sight propagation (NOLS) characteristics for a higher bandwidth and a hybrid automatic repeat request (HARQ) for good error performance. The MAC sublayer can include a number of convergent sublayers that describe how the wire line technology such as Ethernet, Asynchronous Transfer Mode (ATM) and internet protocol (IP) are encapsulated on the air interface and how data is classified. The advanced Encryption Standard (AES) or Data Encryption Standard (DES) can be used during data transfer for higher security. Various power saving mechanisms can be used, including a sleep or idle mode. The quality of service (QOS) can be supported by allocating each connection between a subscriber station and base station.

FIG. 10 illustrates how the WEMS module 20 can interoperate in a wireless connection with an existing Engine Wireless Sensor Network (EWSN) 600 that is formed by a plurality of different wireless engine sensors illustrated in this example as individual nodes 600a-f, to provide precise monitoring of the rotating subsystem such as the turbine blades and bearing assemblies in the aircraft engine, and gas path parameters such as temperature, vibration, strain and pressure. Although only six wireless engine sensors are illustrated, it should be understood that the engine wireless sensor network 600 for one jet aircraft engine can include at a minimum hundreds of such wireless engine sensors. The sensors will sense the different engine parameters that include engine emissions. A separate EWSN CPU 522 (corresponding to the EWSN CPU in FIG. 8) at the WEMS module 20 can interoperate with the engine data received from different wireless engine sensors for communications and that CPU can configure the wireless sensors forming the EWSN 600 to change sampling rates and interrogate sensors through an appropriate wireless transceiver that interoperates with each of the wireless engine sensors. The engine data received from the wireless engine sensors can be processed as explained above and aircraft components adjusted through the FADEC or through wireless communications with selected sensors.

The WEMS module 20 not only interfaces to the FADEC 24 as illustrated in FIG. 10, but also interface wirelessly to the wireless engine sensors that are configured to form the EWSN 600 and monitor the critical engine parameters. The EWSN topology can vary from a simple star network to an advanced, multiple hop wireless mesh network. Propagation between the hops and the network can be by routing or flooding. As shown in FIG. 10, various wireless engine sensors include a fuel flow sensor ($S_F$); temperature sensor ($S_T$); pressure sensor ($S_P$); level sensor ($S_L$); acceleration sensor ($S_A$); and vibration sensor ($S_V$). This is only a representative sample, of course, for illustration purposes, and many other wireless engine sensors are employed in the aircraft engine. Each of the wireless engine sensors can include various transducers that are bidirectional and provide engine control. Each wireless engine sensor forms a wireless node and may include a sensing mechanism and includes a radio transceiver and antenna and a microcontroller (processor) and associated software and an energy (or power) source. This allows real-time detection and diagnosis for faults that can be alerted to a pilot.

The EWSN 600 interoperates with the WEMS module 20 and provides a cost effective method to monitor, detect and diagnose problems and targets mechanically stressed components within a turbine unit or other component of the engine. Use of the EWSN 600 also provides an opportunity for data fusion between the FADEC 24 and EWSN data sources to automatically and wirelessly forward data to the ground based Engine Service Provider operations center 562 for post flight analysis and allow detection, diagnosis and prognosis of problems occurring within different turbine components. The data obtained from the EWSN 600 provides for early detection and diagnosis of turbine component faults and helps prevents catastrophic failures and allows real-time data acquisition for valuable engine operational, performance and design information. The flight deck 30 can include the cabin wireless LAN unit 532 that includes a local engine diagnostics unit 574 that may be a processor or other CPU for local engine diagnostics.

The local engine diagnostics 574 may include an engine controller 578 that is coupled to the aircraft engine and configured to control engine operating parameters. This could be a wired connection to the engine or a wireless connection. The engine controller receives engine data and also weather forecasting data and processes the engine data and current weather forecasting data and changes engine operating parameters during flight based on predicted flight operations caused by weather changes as will be explained in greater detail below. The WEMS data may include the sensed engine parameters as the environmental engine emissions comprising the exhaust concentration of at least one of total hydrocarbons (THC), total organic gases (TOC), particulate matter (PM), carbon monoxide (CO), sulfur dioxide, and oxides of nitrogen. The sensed engine parameters may also include the exhaust gas temperature (EGT) of the aircraft engine during flight. Sensed engine parameters also may include the particle emissions sensed in the exhaust plume of the aircraft.

FIG. 10 also illustrates how the engine wireless sensor network 600 may download engine emissions data. The engine data having the related engine emissions data may be transmitted from the WEMS module 20 to other gateway network nodes for storage in the sensor server. The data is also stored in the WEMS module 20. The engine data together having the engine emissions data may be downloaded to an engine service provider (ESP) such as illustrated at 562 in FIGS. 9 and 10 and analyzed. A processor may receive the engine data, correlate the engine data to the phase of flight of the aircraft engine and perform an analysis to determine a maintenance schedule for the aircraft engine. An analysis of the engine data may include using a Bayesian network that includes a decision tree having variables comprising ranges of engine performance parameters as related to engine emissions, for example. Additionally, the WEMS module may analyze with its processor the engine emissions data and generate an alarm report when the engine emissions exceed a threshold. This is particularly relevant when an aircraft is approaching an airport that may have jurisdictional laws that require emissions to not exceed a threshold and, if possible, the pilot may adjust engine operation to come within the emissions limits. Also, it would give the pilot necessary information for any engine maintenance that may be required. For example, the fuel flow delivery system may have to be cleaned and other short-term maintenance operations performed on the jet engine. If the WEMS module 20 generates an alarm report, it may be displayed on a mobile display device 575, such as a tablet device for the flight crew with the ability to process and display other data on the device.

Figure 11:
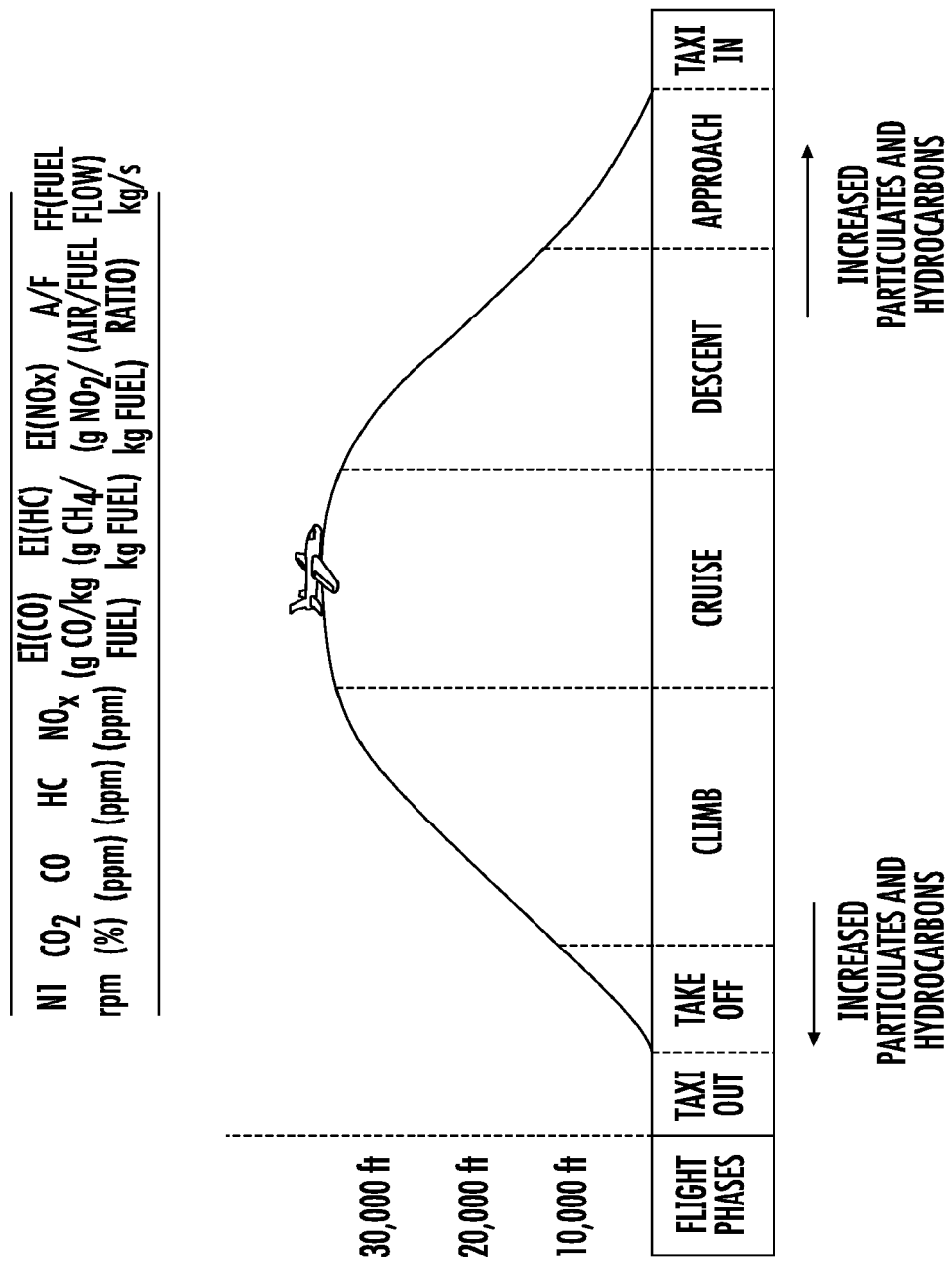
FIG. 11 is a graph showing different phases of flight relative to aircraft engine emissions in accordance with a non-limiting example.

FIG. 11 shows a graph of the different phases of flight and the type of environmental engine emissions data that can be measured as a non-limiting example, including engine operating parameters related to the RPM of the turbine (N1), the air/fuel ratio (A/F) and the fuel flow in kg/s. Other environmental engine emission parameters that may be measured to obtain the engine emission data include carbon dioxide ($CO_2$) as a percentage, the carbon monoxide (CO), hydrocarbons (HC), oxides of nitrogen NOx), all in parts per million (PPM). This data may include the carbon monoxide (CO) or hydrocarbons (HC) as $CH_4$ and the oxides of nitrogen as $NO_2$ as grams per kilogram (kg) of fuel. The graph of FIG. 11 shows how environmental emissions for certain components increase during idle and at the lower engine speeds and are minimal at cruise. Different types of wireless and/or wired engine sensors may be used to sense and measure environmental emissions. Other devices for sensing engine emissions include an aerosol mass spectrometer (AMS), a multi-angle absorption photometer (MAAP), a condensation particle counter (CPC), and differential mobility analyzer (DMA) as non-limiting examples. Other examples may be used.

It is also possible to process data regarding the engine gas temperature (EGT) versus the fan speed, for example, the core speed (N2) and fan speed (N1). If a difference in temperature on EGT from the average of a threshold of about 5 to 10 degrees is sensed, this may indicate deterioration of the engine. It has been found that a fan speed versus fuel flow may be analyzed and a 2% change from threshold is significant. These are example thresholds that can be used for determining when an alarm report should be generated.

Often gauges are not reliable and it is possible to look at the engine core speed EGT and fuel flow. Performance deterioration of the jet engine would tend to increase combustor inlet temperature and the fuel-air ratio, which increases smoke emissions. Measurements of the individual hydrocarbon species indicates that the emission indices for most of the major species of hydrocarbons decrease with increasing engine power in proportion to each other. This has also been seen with formaldehyde, which is a plentiful emitted hydrocarbon and can be measured accurately. The particle compounds as particulate matter (PM) may include sulfate and organic volatile fractions. Some of these compounds may also be measured in the plume by infrared laser and related optics and receivers and received information processed in a detector. It is believed that sulfate contribution has little dependence on engine power, but the organic components in the exhaust are greatest at low engine powers.

Three contributors to carbonyl emissions are formaldehyde, acetaldehyde, and acetone. The WEMS module 20 will analyze these environmental emissions and generate an alarm report as the plane approaches an airport and emits excessive emissions or at landing. It can also generate an alarm report after take-off or during cruising if emissions suddenly increase. The WEMS module 20 may also forward the emissions data and other engine reporting data to the flight deck via the cabin wireless LAN unit (532) or the gateway network nodes, as explained in greater detail below, so that the pilot or other crew member at the flight deck can retrieve the data and display it on a display device located at the flight deck, for example, a tablet, phone, or other device 575 (FIG. 10).

This type of information is beneficial to the flight crew since nitrogen oxides are produced at higher engine power settings. The nitrogen oxide emission index also has a high value at a minimum idle thrust, such as when the aircraft is parked at the airport. The hydrocarbons decreased with increasing power and at a minimum thrust, such as about 21%, for example, the power settings referred to as minimum idle. The hydrocarbons were at maximum concentrations and the emission index of the hydrocarbons was the highest at the minimum idle thrust. The carbon monoxide emissions increased with the decreasing power settings and the carbon monoxide emission indices were the highest value at minimum idle thrust.

It should be understood that aircraft pollutants may transform physically and/or chemically in three different zones: (1) after exiting the combustor within the engine, (2) downstream from the engine in the hot exhaust plume, and (3) after emissions have cooled and mixed with the ambient atmosphere. The heavier hydrocarbons may condense at the aircraft engine exit when the hot combustion gases mix with ambient air to quickly cool the gas stream and form aerosol particles. At the exhaust plume, some emissions continue to cool and some molecules undergo chemical reactions producing other molecules that condense into particles that collide in the plume and form larger particles, although still microscopic in size. Some of the resulting particulate matter (PM) in the plume can be solid or liquid and include carbon in soot, inorganic salts such as ammonium nitrate and ammonium sulfate, and heavy hydrocarbons that condense into aerosol particles.

Some of the emissions have different effects both on climate change and/or air quality. For example, the $CO_2$, $H_2O$, nitrogen oxides, sulfur oxides and particulate matter, such as non-volatile compounds, all may have an impact on climate change while the same products, including hydrocarbons, methane ($CH_4$), and carbon monoxide (CO) may impact air quality. The carbon dioxide is a product of complete combustion of hydrocarbon fuel, for example, the jet fuel and combines with oxygen in the air to produce $CO_2$. The water vapor is also a product of complete combustion. Hydrogen in the fuel combines with oxygen in the air to produce the water in the condensation trails as the contrails. The oxides of nitrogen are produced when air passes through the high temperatures/high pressure combustion chambers in the aircraft engine and the nitrogen and oxygen that are present in the air form the nitrogen oxides. These nitrogen oxides contribute to the ozone and secondary particular matter (PM) formation.

Burning the hydrocarbons may be incomplete as unburned hydrocarbons (UHC) or volatile organic compounds (VOCs), and may exclude some low reactivity compounds. Some of the hydrocarbon emissions are toxic. Hazardous air pollutants (HAPs) contribute to the ozone formation. Methane is a basic hydrocarbon and the impact of methane at the airport is highly dependent on local circumstances. Carbon monoxide is formed because of the incomplete combustion of carbon in the fuel, but also contributes to the ozone formation. The sulfur oxides are produced when small quantities of sulfur that are present in most petroleum fuels combined with the oxygen from the air during combustion and contributed to the secondary particulate matter formation. Many of the non-volatile particulate matter (PM) are the small particles of soot such as the black carbon that forms as a result of incomplete combustion and from the aerosols of condensed gases. These components may be small enough to be inhaled and can affect the elderly and young and have drastic consequences under some environmental conditions, and for that reason, watched closely.

The nitrogen dioxide ($NO_2$) from the plume may be converted to nitric acid ($HNO_3$) vapor that interacts with ammonia in the atmosphere and forms ammonium nitrate ($NH_4NO_3$) particles. Oxidation reactions may involve gaseous hydrocarbons from the plume and yield condensable organic compounds that form organic aerosol particles. These components are health threatening in large concentrations and show the importance of checking and maintaining proper emission levels. Other particulate matter (PM) such as the ground-level ozone, carbon monoxide, sulfur oxides, nitrogen oxides, and lead are common air pollutants that the aircraft may contribute. The climate may have some impact and in any analysis should be taken into consideration, such as for determining maintenance schedules. The climate impacts of aviation emissions in the plume and possibly at the exhaust may be considered.

Climate effects may have impact because of the interaction of solar and thermal radiation by gases such as carbon dioxide and water vapor and pollutants such as carbon monoxide, hydrocarbons and black carbon particles arising from the incomplete combustion in the gas turbine combustor. Any sulfur oxide emissions form sulfuric acid in the presence of water vapor can further interact with ammonia in the earth's boundary layer to form ammonium sulfate particles. The oxides of nitrogen are known to impact the formation of ozone and form nitric acid at cruise altitudes and ammonium nitrate particles in the boundary layer in the presence of ammonia and will affect air quality and thus are monitored. The soot and black carbon particles at cruise altitudes interact with other chemicals such as sulfuric acid or nitric acid and form small particles that act as nucleating sites for condensation of water vapor present in the upper atmosphere under certain conditions. They can form larger particles and condensation trails. Smaller particles may remain suspended in the atmosphere longer and pose a risk to human health.

Other compounds may be associated with the aircraft exhaust and sensed by various sensors. These compounds include benzene, PAH, aldehydes, acetone, acetylene, chromium, xylenes, mercury, nickel, toluene, phenols, cresol and related compounds. The oxides of nitrogen are found to occur primarily at approach, take-off and climb, known as the LTO cycle. The importance of measuring these compounds and other emissions is apparent to those in the medical field. Ozone may impair the lung function, while carbon monoxide has cardiovascular effects. Nitrogen oxides will irritate the lung and lower the resistance to respiratory infections. Particulate matter may have impact on premature mortality and aggravate respiratory and cardiovascular disease and change lung function and increase respiratory symptoms because of changes to lung tissues and structure and the altered respiratory defense mechanisms. The volatile organic compounds (VOCs) may irritate the eyes and the respiratory tract and cause headaches, dizziness, visual disorders and memory impairment.

There are also environmental effects of air pollutants including ozone, carbon monoxide, nitrogen oxides, particle matter, and volatile organic compounds. Processing at the aircraft or at an engine service provider may take into consideration the engine data and environmental emissions data. When sampling at or close to exit at the plane within about 1 meter, emitted particles are log-normally distributed within a single size mode. This can be compared to about 200 meters downstream where the downstream particle distributions exhibit two distinct modes. One may correspond to non-volatile and peak at roughly the same diameters observed in the 1 meter samples. The other particles occupied by freshly nucleated sulfur and organic particles may peak at less than 12 nanometers.

It has been found that for advected plume data on any given day, the engine-engine variability within a given class is less than 5% from mass and number-based emission indices. Changes in ambient atmospheric conditions are likely to impact particulate matter emissions and a larger impact is expected on particle number than on particle mass. Thus, in an analysis, the weather conditions may be taken into consideration, for example, the barometric pressure, air moisture content, wind speed and air temperature.

It has been found that performance deterioration in the jet engine tends to increase combustor inlet temperature, reflecting an increase in the exhaust gas temperature (EGT) and the fuel-air ratio, which increases the smoke emissions. Thus, a direct correlation may be made between the emissions at different phases of flight and a need for maintenance or engine overhaul. The wireless engine sensors may take into consideration different parameters that may be measured, including the total and non-volatile aerosols. The DGEOM is a number based geometric mean diameter that may be considered as well as the sigma as the geometric standard deviation. The DGEOM M as the mass (volumetric metric) based geometric mean diameter may be taken into consideration, including the number based emission index (EIN) and the mass based emission index (EIM). Many jet engines demonstrate an increase in the DGEOM with power. It has also been found that with respect to chromium in the emission measurements, it may not be significantly different to ambient concentrations. It has been determined that the variability of the metal distributions is much greater between engines than between engine loads. The mass of the ions collected on a filter can be low such that only sulfate ions are above detection limits of a detection instrument.

Figure 12:
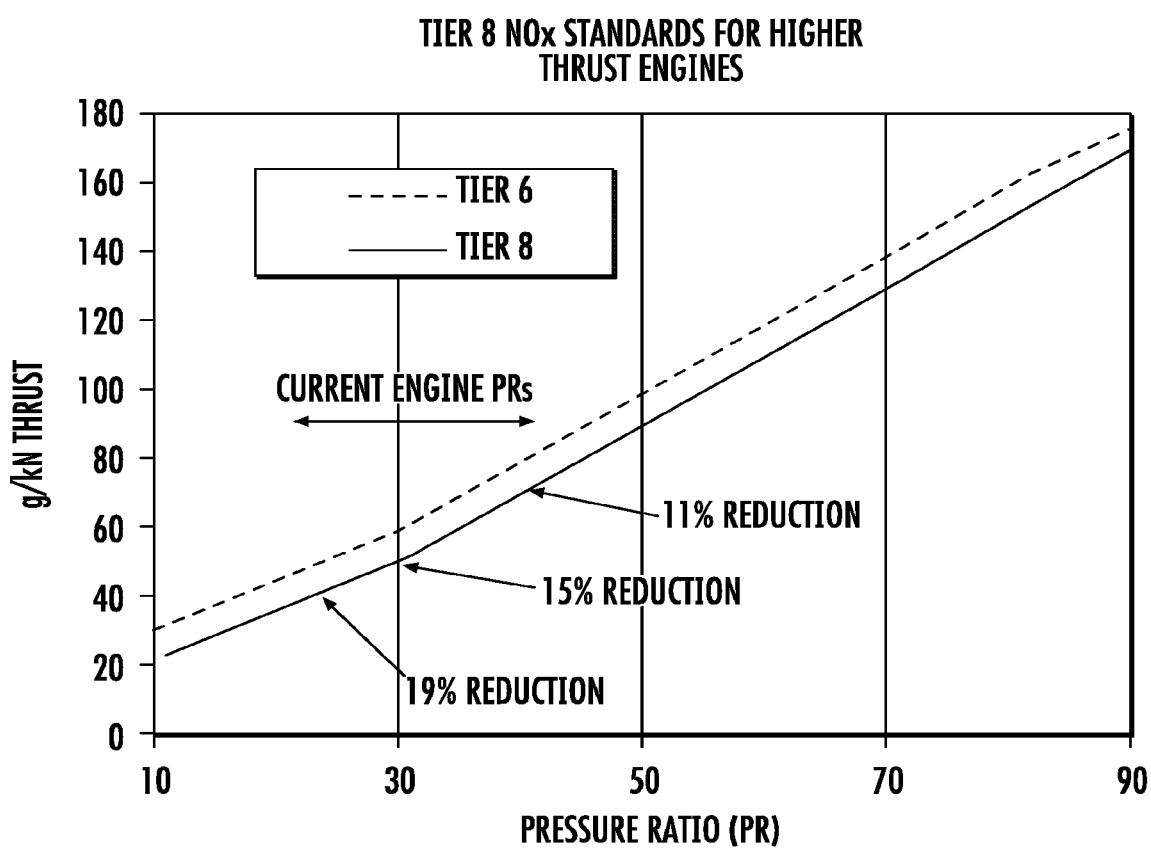
FIG. 12 is a graph showing standards for oxides of nitrogen with thrust versus pressure ratios.

Many of the thresholds that can be used by the engine service provider in determining a maintenance schedule can be those thresholds that are derived from the ICAO standards, which generally use 3,000 feet as a break point and define the mixing height as a vertical region of the atmosphere where pollutant mixing occurs. Above that height, pollutants that are released generally do not mix with ground-level emissions and do not have an effect on ground-level concentrations in the local area. Often the 3,000 feet level is used as a standard. Thus, the height of the mixing zone influences mainly the time-in-mode for approaching and climb out and this is significant primarily when calculating oxide of nitrogen emissions rather than hydrocarbon or carbon monoxide. Some of the thresholds may be seen as in the ICAO emission data and derived emission factors released by the ICAO as set forth, for example, in FIG. 12. This data and derived emission factors may be used to determine thresholds for alarm reports and determining a maintenance schedule in accordance with a non-limiting example.

Even at 1,500 feet at conservative assumptions, the effects on ground-level concentrations for carbon monoxide and hydrocarbons are small. The oxides of nitrogen may be significant, however, for airplane elevations above 3,000 feet because of the ozone effect. Usually the oxides of nitrogen are nitrogen dioxide ($NO_2$), but nitrogen oxide (NO) is problematic and may be measured. In some instances such as in environmentally challenged basins, for example, the Los Angeles basin, the nitrogen dioxide concentration may be less than that of nitrogen dioxide.

The changes in the oxide of nitrogen emission levels may also be correlated with the related emissions to combustor flow parameters. For example, the sensitivity of specific fuel consumption (SFC) and combustor flow parameters to component aging may be enhanced by increases in cycle temperatures and pressures. This would result in a higher sensitivity of the oxide of nitrogen emissions to engine degradation for cycles. The engine performance deterioration may be associated with different aging conditions over time and may include the physical distortion of engine parts due to corrosion, the ingestion of foreign objects, the build-up of deposits (filing), erosion of parts and general wear. The degradation is more manifest with physical changes in the measurable engine parameters, including the exhaust gas temperature (EGT), fuel consumption at specific fuel consumption SFC, or the fuel flow (FF), the turbine inlet temperature, the low or high pressure spool speeds (N1 or N2 respectively), and/or engine pressure ratio (EPR) and changes in other engine performance standards. It has been found that component efficiency losses in flow capacity changes may result in hotter cycle temperatures when a rise in the EGT occurs. For example, a threshold with EGT may be indicated and an overhaul required by a rise in EGT between 30-50 K and/or an increase in SFC of between 2-4%. Thus, a 3% increase in the SFC would be a reasonable degradation limit, and thus, have an impact on the oxide of nitrogen emissions.

Different emissions correlations and equations used with cycles may apply. An example is found in Table 6 for different engine cycles as described in the article by Lukachko and Waitz entitled, "Effects of Engine Aging on Aircraft NOx Emissions," ASME, 1997, the disclosure which is hereby incorporated by reference in its entirety. These types of equations may be used in the analysis for example and are reproduced below:

| Engine | $NO_x$ Correlation as $EINO_2(NO_x)$ |
|---|---|
| CF6-50C2 | $1.35 \cdot 0.0986 \cdot \left(\frac{P_3}{1 \text{ atm}}\right)^{0.4} \exp\left(\frac{T_3}{194.4 \text{ K}} - \frac{H_0}{53.2 \text{ g } H_2O/\text{kg dry air}}\right) + 1.7$ |
| GE90-85B | $0.0986 \cdot \left(\frac{P_3}{1 \text{ atm}}\right)^{0.4} \exp\left(\frac{T_3}{194.4 \text{ K}} - \frac{H_0}{53.2 \text{ g } H_2O/\text{kg dry air}}\right)$ |
| ASE | $0.0041941 \cdot T_4 \cdot \left(\frac{P_3}{439 \text{ psia}}\right)^{0.37} \exp\left(\frac{T_3 - 1471 \text{ R}}{345 \text{ R}}\right)$ |

-continued

| Engine | $NO_x$ Correlation as $EINO_2(NO_x)$ |
|---|---|
| EHSCT | $t_{res} \cdot \exp\left(-72.28 + 2.8 \, T_{adiabatic}^{0.5} \, \dfrac{T_{adiabatic}}{38.02}\right)$ |

FIG. 13 is a graph for NOx standards for higher thrust engines showing the grams per kiloNewton (g/kN) of thrust versus the pressure ratio (PR). The graph applies for the NOx standards for newly certified gas turbine engines with rated thrust between 26.7 but less than or equal to 89.0 Kn and are differentiated by the pressure ratio and rated thrust. This type of graph is helpful to establish the thresholds for generating an alarm report and for aiding in maintenance actions and determining a maintenance schedule. An example of related data is found in the Federal Register, Volume 77, No. 117, Monday, Jun. 18, 2012 Rules and Regulations, page 36356, the disclosure which is hereby incorporated by reference in its entirety.

A plume analysis may be taken into consideration. It should be understood that the plume is a column of one fluid moving through another column and can be measured at the aircraft. Different techniques may be used to analyze the plume. A laser beam may be generated and optics focus the laser beam into the exhaust plume and create a spark. Other sensing apparatus may be carried on an aircraft.

In a non-limiting example, the engine service provider (ESP) may receive the engine data, including the engine emissions data and process the data and perform an analysis to determine a maintenance schedule for the aircraft engine. This may include performing an analysis of the engine data using a Bayesian network comprising a decision tree having variables comprising ranges of engine performance parameters. Other predictive analytics may be used. Data can be assembled as a stream of data packets containing compressed XML documents with a binary header to maintain better tracking of data and the data can be broken into flight plan related, oceanic or host track reports. It is possible to use SPSS as a statistical package, for example, the Social Sciences Related Software and particular data analytics.

Data can be shredded using an XML shredder. A mutable data structure may be used to create data strings. Range-partition tables may be used. The Bayesian network may be used as a graphical model that represents the random variables and conditional dependencies via a directed acyclic graph where the Bayesian network represents probabilistic relationships between the maintenance symptoms, including the engine data reflective of engine wear and problems relative to engine emissions to compute probabilities for engine maintenance. Efficient algorithms can be used to perform the inference and learning in the network.

Figure 14:
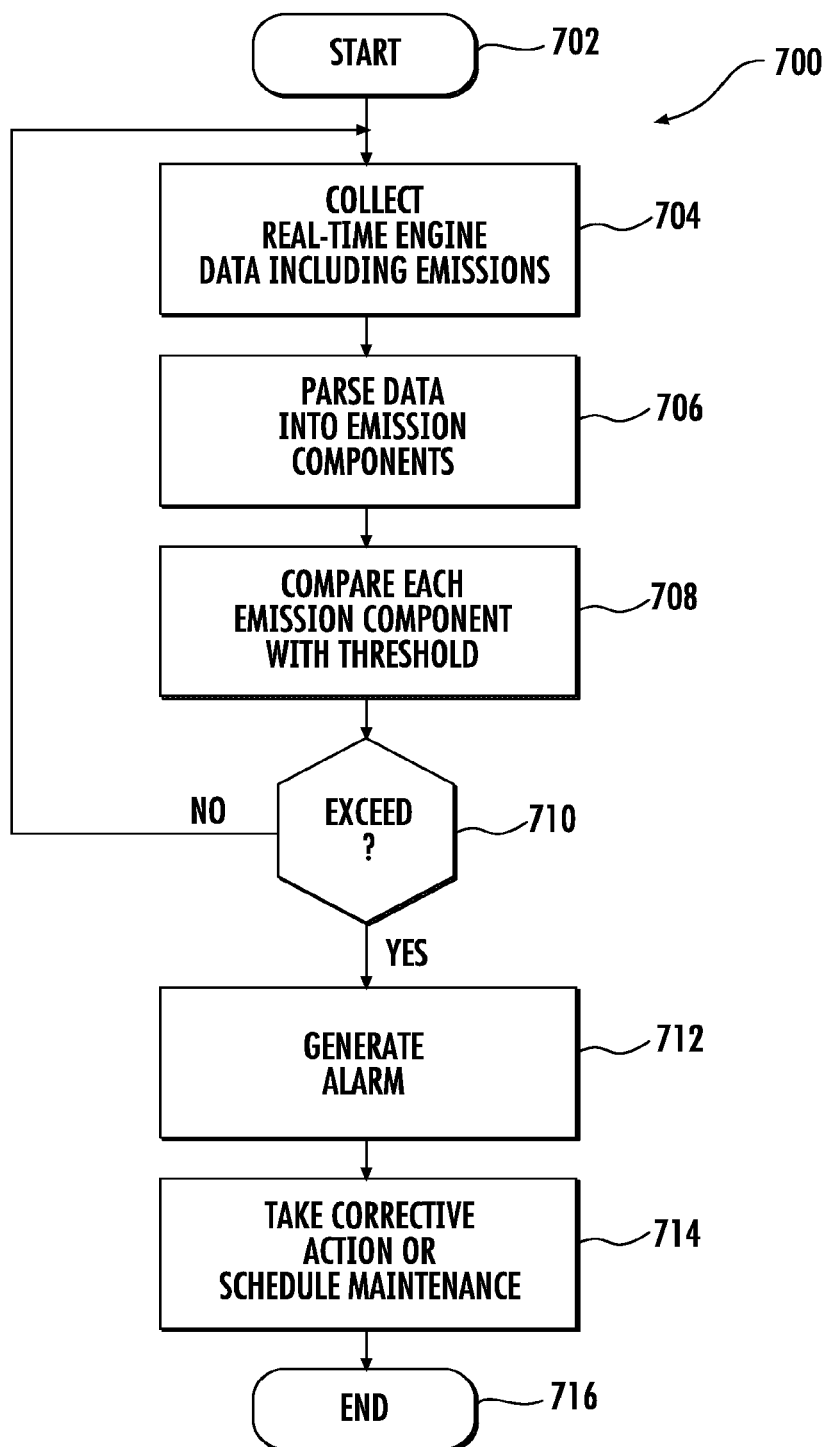
FIG. 14 is a high-level flowchart showing the process of generating an alarm report when aircraft emissions exceed a threshold.

FIG. 14 is a high-level flowchart 760 illustrating how the WEMS Module may generate an alarm report when the environmental engine emissions exceed a threshold. Reference numerals begin in the 700 series. The process starts (Block 702). Engine data is collected in real-time within the WEMS module (Block 704). This engine data includes engine emissions data from sensors such as the wireless engine sensors that sense the engine emissions, for example, particulate matter, hydrocarbons and oxides of nitrogen as non-limiting examples. This data may also include emissions data from a plume analysis as described before.

At the WEMS module 20, the engine data is processed and parsed into data for individual emissions components such as the concentration of oxides of nitrogen or the concentration of selected hydrocarbons (Block 706). The data may also be parsed with regard to the phases of flight. Other emission components are also sensed as described above and the listed are only non-limiting examples. The processor at the WEMS module compares each individual emissions component with the threshold for that component (Block 708) and a determination made if it exceeds or not (Block 710). If any emissions component exceeds the threshold, the WEMS module generates an alarm report to the flight deck (Block 712). If the threshold is exceeded at the flight deck, a pilot can take corrective action or schedule maintenance (Block 714). The process ends (Block 716). If an emissions component does not exceed the threshold, the process starts again.

In an operating example, the aircraft may approach the geographical area near an airport. The local jurisdiction may have rigid environmental rules mandating that engine emissions from an aircraft be within a specific limit or threshold as imposed by the jurisdiction. For example, the total hydrocarbons or a specific hydrocarbon or a nitrogen oxide may be required to be below a certain threshold, such as established by the ICAO and described above. The local jurisdiction may also impose fines on any aircraft that may not be maintaining those emissions at or below the threshold and make spot checks of aircraft records such as from a WEMS module or other recordkeeping databases to determine if emissions are greater than any thresholds. Measurements could even occur at the airport using sensing equipment to measure the exhaust. Also, emissions may be high at idle because the pilot is increasing thrust or turbine speeds, causing excess emissions at the airport and exceeding the threshold. The pilot may be able to make corrective actions by throttling down or changing fuel flow. If not, then maintenance can be scheduled.

Figure 15:
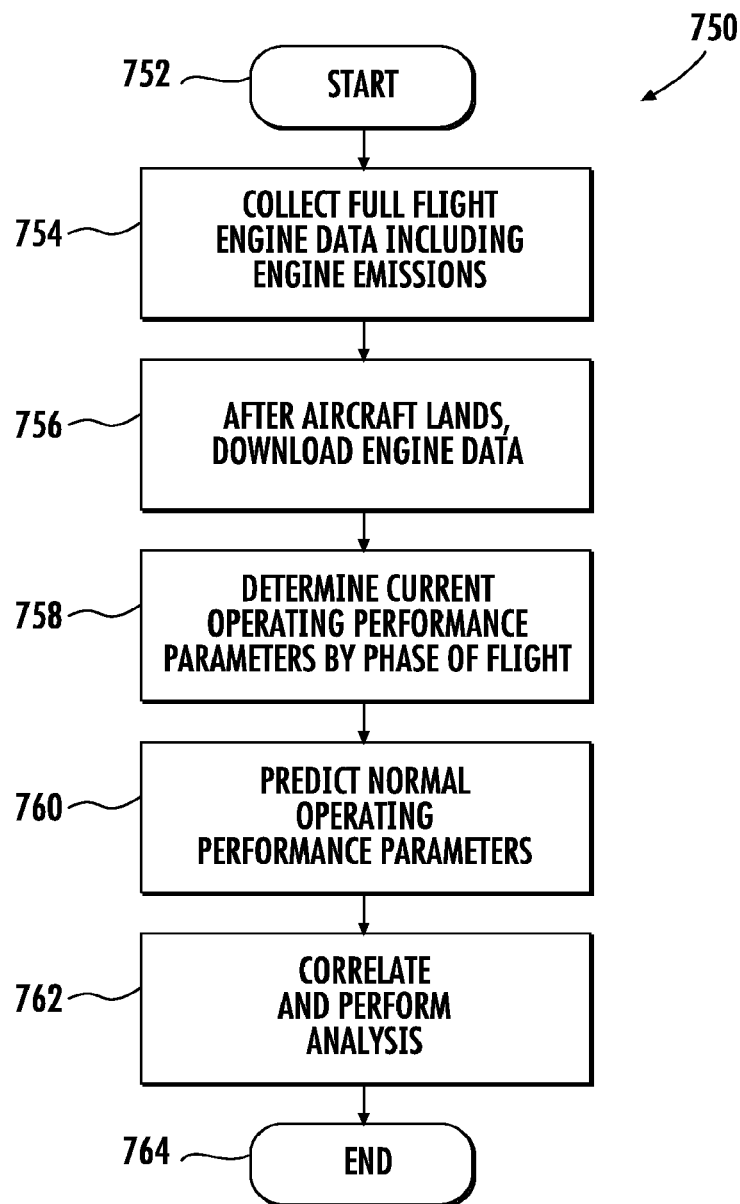
FIG. 15 is a high-level flowchart showing a process for an analysis to determine a maintenance schedule using engine emissions data in accordance with a non-limiting example.

FIG. 15 is a high-level flowchart at 750 illustrating an example method for determining a maintenance schedule of an aircraft engine using the engine data, including the engine emissions data, and using for example, a Bayesian network. The process starts (Block 752) and full flight engine data, including the engine emissions, are collected (Block 754). This data will include the flight conditions and known weather patterns through which the aircraft flies since it may affect thrust, turbine speeds and the environmental engine emissions at different phases of flight. After the aircraft lands, the full flight engine data is downloaded to an engine service provider (ESP) (Block 756). However, data could be downloaded during flight as noted above. The ESP includes a large database of engine performance parameters determined from past flights for the same engine and a database of engine data and engine performance parameters determined from other aircraft engines of the same type. The server located at the engine service provider processes the full flight engine data, including the environmental engine emissions and data related to the flight conditions and weather, to determine current environmental operating performance parameters by phase of flight most notably as related to engine emissions (Block 758). These environmental operating performance parameters include the average or mean emissions for each component or pollutant, for example, as selected hydrocarbons or oxides of nitrogen at a particular phase of flight. There would be spikes and peaks of an engine emission that may deviate from normal for very short periods depending on flight conditions that include weather or other deviations from normal. These are to be expected.

The server will then process the data and predict normal environmental operating performance parameters by phase of flight based on the historical database of flight conditions and known environmental emissions for a number of past flights (Block 760). A Bayesian network may be used as an aid to predict normal environmental operating performance parameters using emissions data and the known flight conditions and weather impacts as obtained from the full flight engine data that had been downloaded during the one flight.

The current environmental operating performance parameters are correlated with the predicted normal environmental operating performance parameters based on an analysis of the wear and/or failures in the aircraft engine and an analysis performed to determine possible faults and/or wear if components and a maintenance schedule determined (Block 762). Different analysis algorithms may be used, including probability analysis programs, learning algorithms and other statistical methods. These may also include correlation methods, multi-variable statistical process analysis, pattern recognition methods, neural networks, fuzzy logic, hidden Markov models, discriminant analysis and others. One preferred example is a Bayesian network, for example, and includes a decision tree having variables comprising ranges of the engine operating performance parameters such as ranges of environmental emissions per component that is measured, such as a selected hydrocarbon. The process ends (Block 764). As well known, a Bayesian network may represent probabilistic relationships between a failed component and the environmental emissions. Given the environmental emissions, the probabilities of failed components may be determined. The Bayesian network is only one type of analysis that may be used as noted above.

Figure 16:
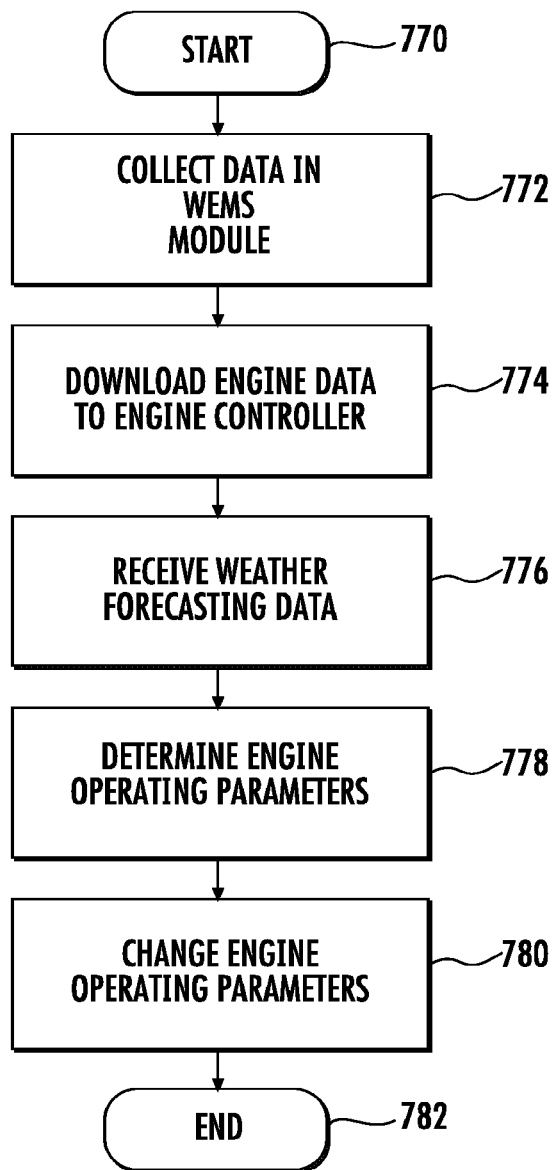
FIG. 16 is a high-level flowchart showing a process for using weather for existing data and the WEMS engine data to change engine operating parameters.

FIG. 16 is a high-level flowchart showing a process for using current weather forecasting data and the WEMS module and its engine data to change engine operating parameters during flight based on predicted flight operations caused by weather changes. The process starts (Block 770) and data is collected in the WEMS module regarding sensed engine parameters, including environmental engine emissions (Block 772). The engine data is downloaded to the engine controller (Block 774) such as located at the flight deck. Weather forecasting data is received within the engine controller (Block 776). Engine operating parameters are determined based on the engine data and current weather forecasting data (Block 778) and the engine operating parameters changed (Block 780) as the aircraft travels into the changed weather patterns. The process ends (Block 782). Big data analytics may be used on the weather forecasting data coupled with the WEMS data for predicted flight information and changing the engine operating parameters during flight. Various sensors may determine how much carbon emission is released into the atmosphere and fuse the weather forecasting data using plume diagnostics to determine the geographic impact on emissions. Weather forecasting data may be obtained from a weather service provider. The weather service provider's extensive data analytics may be used, including the data for winds aloft, temperature, pressures, and similar data points. It is possible to make changes not only to the engine operation, but also to other avionic systems, including auto pilot systems such as for reducing drag-coefficients at optimum altitude. The extensive weather data can also be coupled with past engine data analytics obtained from the WEMS module with regard to how the engine in the airframe operates when the plane flies over different terrain, such as desert, ocean, tundra and other geographical areas. This information may be used to determine carbon credits, which refers to the tradable certificates or permits representing the right to emit 1 ton of carbon dioxide or the mass of another greenhouse gas with a carbon dioxide equivalent to 1 ton of carbon dioxide. It is possible to detect a severe weather front using a severe weather detection and warning method such as disclosed in commonly assigned U.S. patent application Ser. No. 15/003,935. The engine controller may include a transceiver that can work with the severe weather detection and warning devices to receive signals therefrom. As new geosynchronous earth-observing satellites are introduced, many have the capability to collect atmospheric soundings such as temperature and moisture content. The system has hemispherical coverage and high resolution such as 4 km and a rapid refresh of about 5 to 10 minutes and can be used to produce stability (AS) and wind measurements which are combined with ground-based radar to produce a graphical representation of future weather to make the flight cabin more aware of weather patterns. It is possible to measure the Exhaust Gas Temperature and correlate that with sensed carbon emissions and determine carbon credit data and in some cases correlate that with weather patterns. Also, it is possible to monitor real time and full flight engine data obtained from the WEMS module and measure carbon emissions to determine carbon credits and add into the analysis weather parameters described above.

Figure 17:
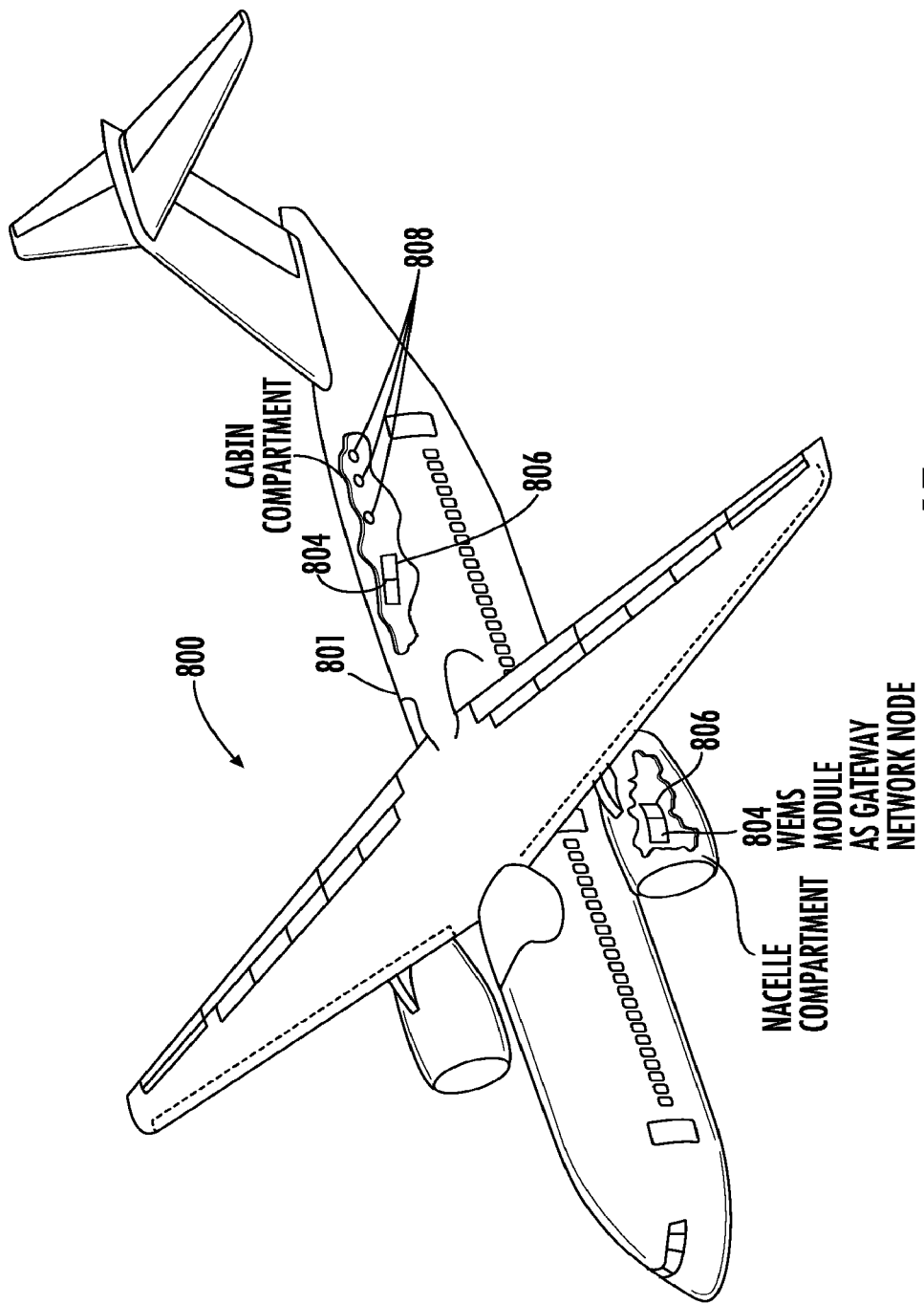
FIG. 17 is an environmental view of an aircraft showing an aircraft monitoring system having gateway network nodes communicating with wireless sensors and the WEMS module as a gateway network node in accordance with a non-limiting example.
Figure 18:
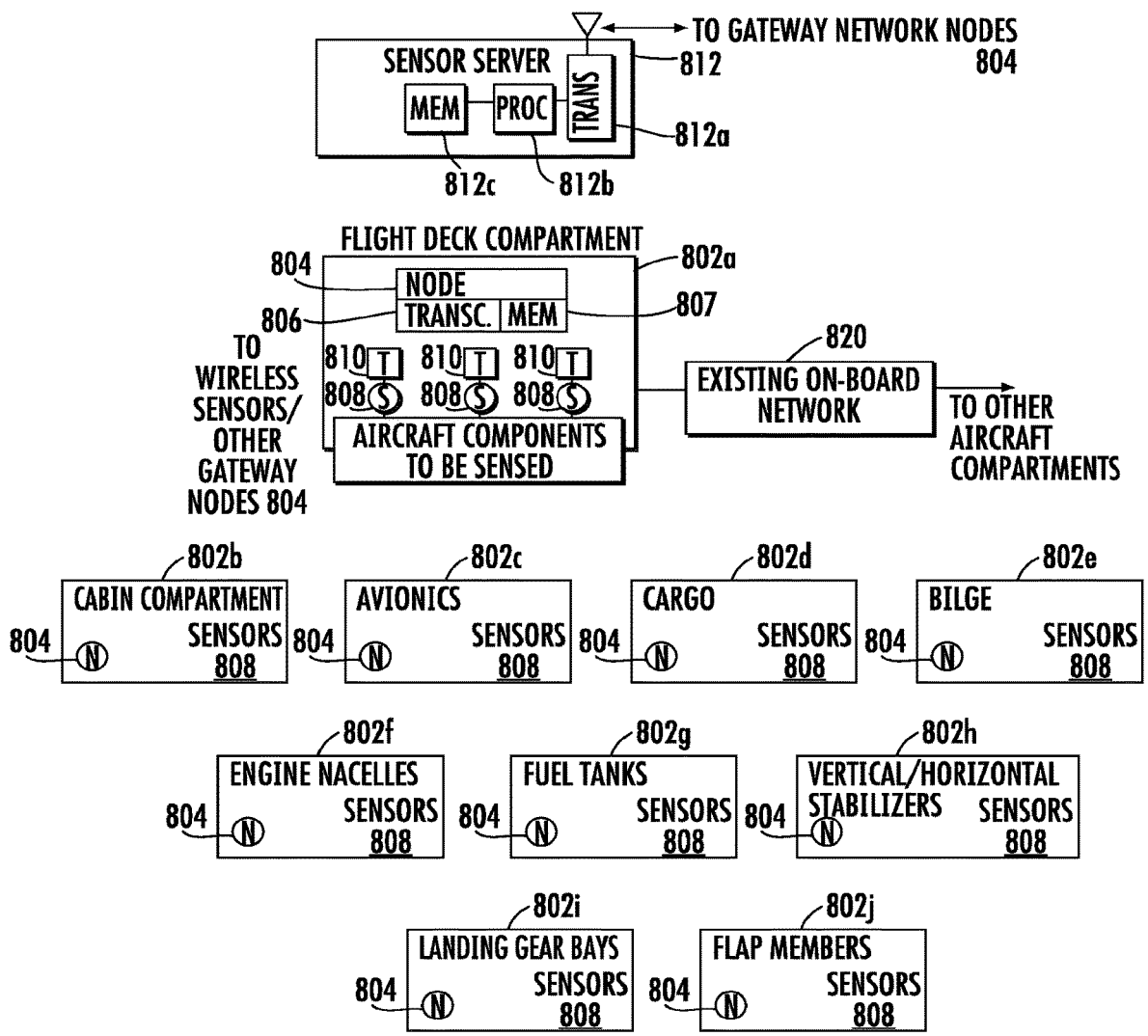
FIG. 18 is a block diagram showing a plurality of aircraft compartments, each having a gateway network node and wireless sensors in accordance with a non-limiting example.

Referring now to FIGS. 17 and 18, there is illustrated in greater detail an aircraft monitoring system 800 as part of a WAIC as generally described before. For reference, numerals begin in the 800 series. The aircraft 801 includes a plurality of aircraft compartments. Each aircraft compartment includes a gateway network node 804 and having a wireless gateway transceiver 806 and optionally a memory 807. A plurality of wireless sensors 808 are each connected to an aircraft component to be sensed. As better shown in FIG. 17, each wireless sensor 808 includes a sensor transceiver 810 configured to receive aircraft data from a sensed aircraft component and transmit that aircraft data to the wireless sensor server 812 via the gateway network node 804 positioned within the respective aircraft compartment 802. Each gateway network node 804 may be connected to an existing on-board communications network 820 such as an avionics data bus and also each gateway network node 804 may be configured in a, multi-hop network configuration to communicate with each other and with the wireless sensor server 812 and wireless sensors 808 using a wireless communications protocol. An example of the wireless communications protocol includes at least one of time division multiple access (TDMA), frequency division multiple access (FDMA), code division multiple access (CDMA), space division multiple access (SPMA), and orthogonal frequency division multiplexing (OFDM).

The aircraft may include many different aircraft compartments and FIG. 18 illustrates the compartments as a flight deck 802a, cabin compartment 802b, avionics compartment 802c, cargo compartment 802d, bilge 802e, engine nacelles 802f, fuel tanks 802g, vertical and horizontal stabilizers 802h, landing gear bays 802i and flap members 802j. The different aircraft components to which the wireless sensors 808 interface may include an actuator or display as non-limiting examples. The wireless sensor server 812 includes a server transceiver 812a, processor 812b and memory 812c.

The server processor 812*b* is configured to store within the memory 812*c* the aircraft data received from each of the gateway network nodes 804 in one non-limiting example. The on-board communications network 820 at the engine nacelle 802*f* may comprise a full authority digital engine controller/engine control unit (FADEC/ECU) as described previously and connected to the engine monitoring module, which in this example operates as a gateway network node 804 to communicate with other gateway network nodes.

The WEMS module 20 is a part of this wireless avionics intra-communications (WAIC) radio communication network between different points on the one aircraft and operates for safety-related applications. The WAIC network can meet standards such as provided in the technical characteristics and operational objectives for wireless avionics intra-communications (WAIC) as promulgated by the International Telecommunication Union (ITU).

Different wireless sensors 802 in the different compartments 802 may include sensors to sense cabin pressure, sense smoke in unoccupied and occupied areas, sense fuel tanks and fuel lines and sense proximity and leaks at the passenger and cargo doors and panels. Sensors can be included for valves and other mechanical moving parts, ECS, EMI detection, emergency lighting control, general lighting control, and cabin control. Some sensors can be placed on removable items in the cabin such as for inventory control. Over 130 smoke sensors may be used in occupied areas. Larger planes can have about 80 fuel tank and fuel line sensors, which operate as a low data rate application of less than 10 Kbit/S.

Other exterior or outside sensor applications may include ice detection, landing gear or proximity sensing such as tire pressure and brake temperatures. Landing gear sensors may include wheel speed sensors for anti-skid control and position feedback for steering. Other sensor applications include flight control sensing and sensors associated with position feedback and control parameters. Cargo compartment data and structural sensors may be used. These sensors may operate at low data rates. High data rates such as greater than 10 Kbit/S first rate per node may be used both inside and outside the aircraft structure. High data rate applications could include air data sensors, a FADEC aircraft interface, engine prognostic sensors, the flight deck and cabin crew voice sensors, fixed imagery sensing at the flight deck, cabin crew fixed imagery sensing, and flight deck crew motion video sensing. Other applications could include those applications associated with the avionics communications bus, the audio communication system, structural sensors, external imaging sensors such as cameras and active vibration control. Each wireless sensor may included an antenna having a beamwidth that can vary between 50 to 180 degree beamwidths and some low gain antennas may have beamwidths greater than 180 degrees.

The WEMS module 20 is beneficial for power generation design such that aircraft turbine designers benefit from data collected during continuous field operation of their engines. This allows for design improvements in the safety, reliability and efficiency of future engine systems. Mission critical networks (MCN) will also be able to explore related opportunities for the commercial aviation market based on data obtained by the WEMS module interoperative with the EWSN 600, which is a potential driver for future electronic enabled airplane health management (AHM) that is real-time, continuous and proactive. One beneficial opportunity is applicable to commercial/military helicopter technology with health and usage monitoring systems (HUMS).

Different wireless engine sensors can be used in the engine wireless sensor network 600. Typically, each wireless engine sensor forms a wireless engine sensor node and provides a radio interface and processor capability. The wireless engine sensors can operate at 600 or more degrees Centigrade in the harsh environment of the jet turbine engine to measure strain, heat and gas. These wireless engine sensors are advantageous over wired sensors that are difficult, impractical or expensive and difficult to implement with rotating components that damage the wire leads, making wired sensors impractical in an aircraft engine. Some wireless engine sensors use a passive power source because battery power is not feasible.

These wireless engine sensors are typically lightweight and conformal for use on different rotating and non-rotating surfaces and can operate inside the turbine jet engines without unbalancing the engine or disrupting the aerodynamics. It is possible for the wireless engine sensors to measure strain with 50 KHz variations and operate at even higher frequencies with modal vibrations that occur two to about three times the vane passing frequency. In one example, the wireless engine sensors are formed from surface acoustic wave (SAW) devices that operate in excess of 1,000 Degrees C., thus allowing them to be used for different wireless strain, temperature and sensing applications in severe radio frequency (RF) multipath and Doppler environments.

In one non-limiting example, SAW sensors capture the RF energy from a resonant antenna structure during interrogation such as a signal emanating from the transceiver of the WEMS module to excite the different surface acoustic waves by piezoelectric coupling to a substrate material. Typically the acoustic waves are delayed between metallic reflectors in proportion to the strain experienced at that instant when strain is imparted, and thus, the strained sensing is intrinsic to the device. The reflected acoustic wave is re-radiated back into the RF domain and the now-modulated data signal is received by the remote RF interrogation unit such as by the transceiver at the WEMS module and process engine data through any associated EWSN CPU. Any differential time delay between the two strain reflectors is computed, for example, at the EWSN CPU in this non-limiting example based on the phase of the received signal. Any time span between the RF "data" and the "reference" signals is typically about 100-200 nanoseconds and thus a jet engine spinning at a high RPM is frozen in position when the data points are collected.

The advantages of the wireless engine sensors as described include the passive power feature with no complex circuitry failing at high temperatures together with the wireless technology that is small, lightweight and conformal to minimize the impact on engine performance.

Referring again to FIG. 10, it is also possible to have a passive, wireless engine sensor network 600 that uses a microwave acoustic sensor, for example, using acoustic wave technology as a bulk acoustic wave (BAW) device, film bulk acoustic resonator (FBAR), acoustic plate mode (APL) device, or a surface acoustic wave (SAW) device as described above and as described in the incorporated by reference U.S. Pat. No. 9,026,336, and commonly assigned U.S. application Ser. No. 14/810,535, and published as U.S. Patent Publication No. 2015/0330869, the disclosure which is hereby incorporated by reference in its entirety.

The wireless engine sensors can also use microelectromechanical systems (MEMS) technology and RF powered LC sensors and high temperature thermo-couples or even optical sensors as described in the above-identified and incorporated by reference patent applications and patents.

The wireless engine sensor could be formed as an inductor with a lead-lanthanum-zirconate-titanate (PLZT) ceramic capacitor having temperature dependent characteristics and include an inductor-capacitor (L-C) tuned electronic oscillator that incorporates the temperature sensitive materials with a change in the value of the capacitance due to the temperature variation translated into modulation in the oscillator frequency as described in the above-identified and incorporated by reference patents and patent applications.

A communications module could implement communications using a BFSK (binary phase shift key) modulation and frequency hopping spread spectrum (FHSS) multiple access with a digital data interface, frequency synthesizer, and transmitter and receiver. Microprocessor and programmable logic can be included as a communications protocol stack implementation. Each wireless engine sensor as a node could transmit its own power capability data in order to receive power data from one or more other sensor nodes and can determine an optimum data transmission route through a wireless sensor communication network. Typically a data transmission route would be through the wireless sensor node or nodes that have the greatest power capability. Some power routing can be implemented with one of at least ad-hoc, on-demand distance vector routing protocol (AODD), dynamic source routing (DSR) and global state routing (GSR).

Each wireless engine sensor node could also transmit data representative of its position and if in a fixed position that position data will be a constant. If the wireless engine sensor is located on a rotating component, then the sensor position would change, and the position data would be preferably transmitted simultaneously with the sensor data and power capability data. It is possible to use any received identification data to determine if a wireless engine sensor node transmits identification data as a member of the network. Each wireless engine sensor node could be assigned a given access time to the network similar to a TDMA system. It is possible to use a vibration-powered generator as part of the power supply that is driven by engine vibration and converts mechanical power to electrical power. Different power scavenging mechanisms can be implemented using MEMS technology to make the nodes as small as possible.

As noted before, the WEMS module 10 includes an EWSN CPU as shown in FIG. 10 that could be remotely configurable by a processor in the WEMS module, on the crew or a processor at the flight deck, or by the Engine Service Provider operations center 562. The operations center can also transmit instructions to the EWSN 600 via the WEMS module to vary sampling rates on specific wireless engine sensors. The sampling rates are programmable for each of the different wireless engine sensors to permit programmable sensor monitoring, provide detection and diagnosis of faults and allow intelligent maintenance for "real-time" monitoring of critical engine parameters using "customized sampling."

Use of EWSN in conjunction with the WEMS module provides for improved monitoring of reduced thrust take-offs to the minimum required for safe take-off because different wireless engine sensors can be sampled at a greater rate, for example, at take-off and thrust could be adjusted. On some occasions when the full thrust would be more than safely required such as for lower weight flights, long runway or head wind, it is possible to choose a thrust setting below the full thrust by telling the engines via the FMC (Flight Management System) that the OAT (Outside Air Temperature) is much higher. Temperature control using the EWSN is beneficial and various take-off tables can be used as assistance.

As noted before, it is possible to use the exhaust gas temperature (EGT) margin as the buffer between the engine's normal operating EGT temperature and its maximum EGT, i.e., the temperature at which it must be inspected, overhauled or replaced. The higher EGT may be an indication of the HPC wear that can cause compressor stall. Different variables can be measured such as flow through a fuel metering valve, a variable bleed valve, variable stator vein, the fan speed ($N_1$), the core speed ($N_2$), fan inlet temperature, fan inlet pressure, the LPC outlet temperature, the combustor static pressure, the HPT exhaust gas temperature and the core exhaust pressure. Other actuators can be measured including the fuel flow (WF), variable bleed valve (VBV) and variable stator veins (VSV) operation.

The EGT can be compared with the primary engine power indication called the engine pressure ratio (EPR). For example, at full power EPR there is a maximum permitted EGT limit. Once an engine reaches a stage where it reaches this EGT limit, the engine requires maintenance. The amount below the EGT limit is the EGT margin and this margin would be greatest when the engine is new or has been overhauled. The EGT margin is a buffer between an engine's normal operating EGT temperature and its maximum EGT and the higher EGT is an indication of the HPC wear that can cause a compressor stall. Engines are rarely used at the full thrust rating and usually have a level of derate for take-off power that reduces the EGT and increases the EGT margin. Derates at 5% and 10% will reduce EGT and increase the EGT margin by as much as 36 degrees. Derating can be used if the aircraft take-off weight is less than permitted maximum take-off weight (MTOW) and a long runway is available or the OATS are relatively low.

Air frame health management allows in-flight diagnosis and assessment through the integration of the wireless engine sensors, sensoring materials and advanced algorithms that reconstruct damage fields and estimate structural durability and remaining useful life. These algorithms could be incorporated within the WEMS module and incorporate advanced information processing techniques including neural networks, expert systems, fuzzy logic systems, pattern recognition, signal processing for spectral analysis and feature extraction and statistical algorithms for detection, estimation, prediction and fusion. It is also possible to use the EWSN 600 and WEMS module 20 to maintain LRU (line replaceable unit) fault states that have a gas path impact such as offset errors in gas path sensors or actuators. This could reduce false alarms and false ambiguities. The WEMS module 20 as described also enables greater control over life limited parts (LLP) such as the rotating turbine engine parts that are critical to engine integrity and are difficult to inspect outside the engine. The WEMS module 20 in conjunction with the wireless sensor network 600 provides engine condition base maintenance (CBM) to optimize engine maintenance costs while increasing operational performance with advanced fleet management and removal planning of aircraft engines.

The wireless engine sensors may sense engine parameters as engine data based on an engine sampling algorithm that is received from the WEMS module 20. The new algorithm may be uploaded via a ground based transceiver and processor as part of an engine data control center 300 that processes engine data. The control center 300 will generate and transmit back to the aircraft a new engine sensing algorithm, which may be transmitted directly to the WEMS module 20 and then to the wireless sensor network (EWSN) 600 or to the WEMS module via the CWLU 532 in most circumstances. The WEMS module 20 may store dynamic or static algorithms. Dynamic algorithms that are uploaded to the WEMS module may instruct the sensor network 600 to sample new engine data via instructions to individual sensors to start, stop, or change a sampling rate. The ground based control center 300 generates engine performance reports indicative of the engine health and status. These can be mini-reports by phase of flight corresponding to taxiing, take-off, climb, cruise, descent, final approach, and taxiing.

The comparative fuel performance of turbine engines may be analyzed using a differential fuel flow by phase of flight. This could include a comparative fuel performance of dual turbine engines or a plurality of turbine engines mounted on the aircraft and using common environmental factors. For example, each phase of flight corresponds to a certain time period or range of time such as taxiing, take-off and the other phases as noted before. The weight of the fuel at each phase of flight or combination of phases or the entire flight for each turbine engine can be calculated as the absolute value at each phase using, for example, the weight of fuel consumed at one of the phases, or at a combination of phases, or all the phases added together for engine 1 and the weight of fuel consumed at one or more phases in engine 2 when there are two engines. Different formulas may be used as known to those skilled in the art depending on the type of engine and aircraft.

Because the algorithms are uploaded to the WEMS module 20 and data is transmitted from the wireless engine sensors 600 to the WEMS module 20 and into the wireless LAN unit 532 within the aircraft, the pilot may have access to the data for processing on board the aircraft. The pilot may initiate engine operating changes, such as shutting down an engine during an emergency or making pilot initiated changes to sensor sampling at a selected engine if the pilot wants additional data on a specific engine component. The pilot could initiate other engine operation changes. It is preferred that data is off-loaded to the ground based control center 300 for processing. The WEMS may be configured on-the-fly with uploaded new engine sampling algorithms or other algorithms that are used to operate the engine and other aircraft systems. An important consideration in engine operation is the Exhaust Gas Temperature (EGT), which can be indicative of the operating efficiency of the turbine engine. For example, if the engine is in need of maintenance or has structural integrity problems or other issues, often the exhaust gas temperature will increase over a period of time and be higher than normal. The pilot could initiate additional engine sensor sampling to gain a better understanding of engine operation and performance during different phases of flight and maintain better control over how the exhaust gas temperature changes during the phases of flight or other flight circumstances. The system is advantageous to monitor the health and status of turbine engines from "on the engine" rather than from the flight deck in certain circumstances.

It should be understood that the exhaust gas temperature is an excellent measure of engine health and an overall indicator of mechanical stress where the EGT rises over time as the engine uses up its useful on-wing life. Determinations can be made at the ground based control center 300 regarding any temperature differences between the actual operating temperature and an absolute maximum operating temperature known as redline that becomes a function of the EGT margin. The ground based control center 300 can determine with the pilot when full thrust is applied and determine if the EGT maximum is surpassed. Also, the ground based control center 300 may determine how the pilots are operating the engine, which can have an impact on the exhaust gas temperature and cause engines to fail early. Pilots can later be educated for better flight practices.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. An aircraft system for an aircraft engine having a plurality of engine sensors associated therewith, the aircraft system comprising:
    an engine monitoring module comprising
      a housing mounted at the aircraft engine,
      a wireless transceiver carried by the housing, and
      a processor carried by the housing and configured to collect engine data from the plurality of engine sensors, wherein the engine data includes engine performance data and environmental engine emissions data during different phases of flight, and transmit the engine data via the wireless transceiver; and
    a wireless LAN unit and processor at the flight deck of the aircraft and configured to
      receive the engine data from the engine monitoring module,
      receive current weather forecasting data, and
      determine environmental operating performance parameters of the aircraft engine based on the environmental engine emissions data, current weather forecasting data, and different phases of flight as the aircraft flies into changed weather patterns and transmit pilot initiated commands to the aircraft engine to initiate engine operating changes during different phases of flight.

2. The aircraft system according to claim 1, wherein the pilot initiated commands are configured to initiate engine operating changes during flight based on predicted flight operations caused by forecasted weather changes.

3. The aircraft system according to claim 1, wherein the engine monitoring module comprises a memory carried by the housing and coupled to the processor to store the engine data.

4. The aircraft system according to claim 1, wherein the wireless LAN unit comprises a wireless access point within the flight deck of the aircraft.

5. The aircraft system according to claim 1, wherein the environmental engine emissions data comprises exhaust concentration data of at least one of total hydrocarbons (THC), total organic gases (TOC), particulate matter (PM), carbon monoxide (CO), sulfur dioxide, and oxides of nitrogen.

6. The aircraft system according to claim 1, wherein the wireless LAN unit and processor are configured to process the engine data based on at least one phase of aircraft flight.

7. The aircraft system according to claim 6, wherein the at least one phase of aircraft flight comprises at least one of taxiing, take-off, climb, cruise, descent, and final approach.

8. The aircraft system according to claim 1, wherein the engine data comprises exhaust gas temperature (EGT) data.

9. The aircraft system according to claim 1, wherein the engine data comprises particle emission data from an engine exhaust plume.

10. An aircraft system for an aircraft engine having a plurality of engine sensors associated therewith, the aircraft system comprising:
- an engine monitoring module mounted at the aircraft engine and comprising a wireless transceiver configured to transmit engine data from the plurality of engine sensors wherein the engine data includes engine performance data and environmental engine emissions data during different phases of flight; and
- a wireless LAN unit and processor at the flight deck of the aircraft and configured to
- receive the engine data from the engine monitoring module,
- receive current weather forecasting data, and
- determine environmental operating performance parameters of the aircraft engine based on the environmental engine emissions data, current weather forecasting data, and different phases of flight as the aircraft flies into changed weather patterns and transmit pilot initiated commands to the aircraft engine to initiate engine operating changes during different phases of flight.

11. The aircraft system according to claim 10, wherein the pilot initiated commands are configured to initiate engine operating changes during flight based on predicted flight operations caused by weather changes.

12. The aircraft system according to claim 10, wherein the wireless LAN unit comprises a wireless access point within the flight deck of the aircraft.

13. The aircraft system according to claim 10, wherein the environmental engine emissions data comprises exhaust concentration data of at least one of total hydrocarbons (THC), total organic gases (TOC), particulate matter (PM), carbon monoxide (CO), sulfur dioxide, and oxides of nitrogen.

14. The aircraft system according to claim 10, wherein the wireless LAN unit and processor are configured to process the engine data based on at least one phase of aircraft flight.

15. The aircraft system according to claim 14, wherein the at least one phase of aircraft flight comprises at least one of taxiing, take-off, climb, cruise, descent, and final approach.

16. The aircraft system according to claim 10, wherein the engine data comprises exhaust gas temperature (EGT) data.

17. The aircraft system according to claim 10, wherein the engine data comprises particle emission data from an engine exhaust plume.

18. A method for operating an aircraft comprising an aircraft engine having a plurality of engine sensors associated therewith, the method comprising:
- operating an engine monitoring module mounted at the aircraft engine and comprising a wireless transceiver transmitting engine data from the plurality of engine sensors wherein the engine data includes engine performance data and environmental engine emissions data during different phases of flight; and
- operating a wireless LAN unit and processor at the flight deck of the aircraft to
- receive the engine data from the engine monitoring module,
- receive current weather forecasting data, and
- determine environmental operating performance parameters of the aircraft engine based on the environmental engine emissions data, current weather forecasting data, and different phases of flight as the aircraft flies into changed weather patterns and transmit pilot initiated commands to the aircraft engine to initiate engine operating changes during different phases of flight.

19. The method according to claim 18, wherein the pilot initiated commands initiate engine operating changes during flight based on predicted flight operations caused by weather changes.

20. The method according to claim 18, wherein the wireless LAN unit comprises a wireless access point within the flight deck of the aircraft.

21. The method according to claim 18, wherein the wireless LAN unit and processor process the engine data based on at least one phase of aircraft flight.

22. The method according to claim 18, wherein the engine data comprises exhaust gas temperature (EGT) data.

23. The method according to claim 18, wherein the engine data comprises particle emission data from an engine exhaust plume.

* * * * *